(12) United States Patent
Okutani et al.

(10) Patent No.: US 7,620,676 B2
(45) Date of Patent: Nov. 17, 2009

(54) LOOKUP TABLE AND DATA ACQUISITION METHOD

(75) Inventors: Shigeaki Okutani, Yokohama (JP);
Toshiro Nakazuru, Kawasaki (JP);
Noboru Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 724 days.

(21) Appl. No.: 11/346,581

(22) Filed: Feb. 3, 2006

(65) Prior Publication Data

US 2006/0190515 A1    Aug. 24, 2006

Related U.S. Application Data

(63) Continuation of application No. PCT/JP03/09851, filed on Aug. 4, 2003.

(51) Int. Cl.
*G06F 7/50* (2006.01)
(52) U.S. Cl. .................................. 708/671
(58) Field of Classification Search ............. 708/671; 711/206–207
See application file for complete search history.

(56) References Cited

U.S. PATENT DOCUMENTS 5,237,656 A * 8/1993 Kurakake et al. ........... 708/671

6,279,097 B1 * 8/2001 Kaku ........................ 711/206
2002/0018073 A1 * 2/2002 Stradley et al. ............. 345/698
2003/0208660 A1 * 11/2003 van de Waerdt ............. 711/137

FOREIGN PATENT DOCUMENTS

| JP | 2-308674 | 12/1990 |
| JP | 4-80816 | 3/1992 |
| JP | 4-335453 | 11/1992 |
| JP | 5-183443 | 7/1993 |
| JP | 5-210429 | 8/1993 |
| JP | 5-241794 | 9/1993 |
| JP | 10-300517 | 11/1998 |
| JP | 11-184549 | 7/1999 |
| JP | 2000-506713 | 5/2000 |
| JP | 2000-341546 | 12/2000 |
| WO | 98/30949 | 7/1998 |

* cited by examiner

*Primary Examiner*—Tan V Mai
(74) *Attorney, Agent, or Firm*—Staas & Halsey LLP

(57) ABSTRACT

Input data is divided into a plurality of blocks, and the blocks are corresponded to each address of the lookup table, and a block is divided into a plurality of sections according to the change of the output data, and at this time position information to indicates the boundary of the section, and output data in each section are stored in an address corresponding to each block, so that the memory capacity required for the lookup table can be decreased.

11 Claims, 13 Drawing Sheets

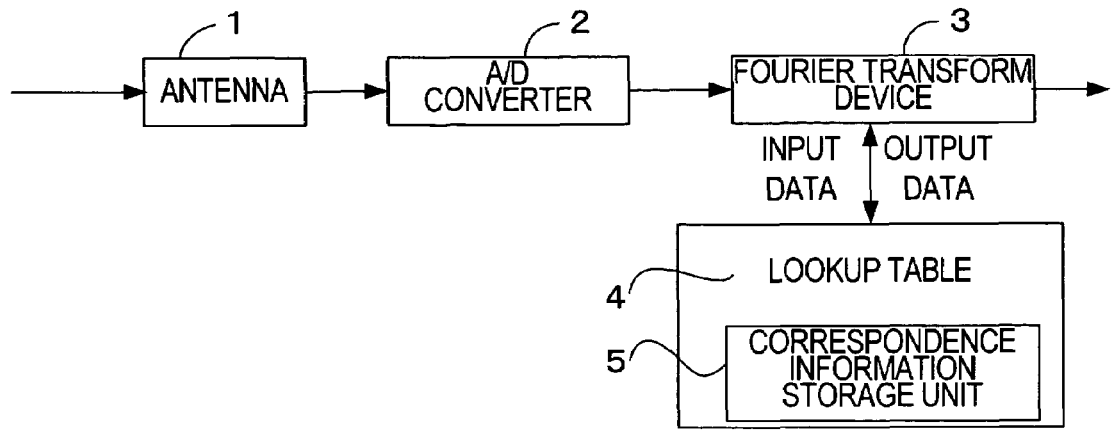
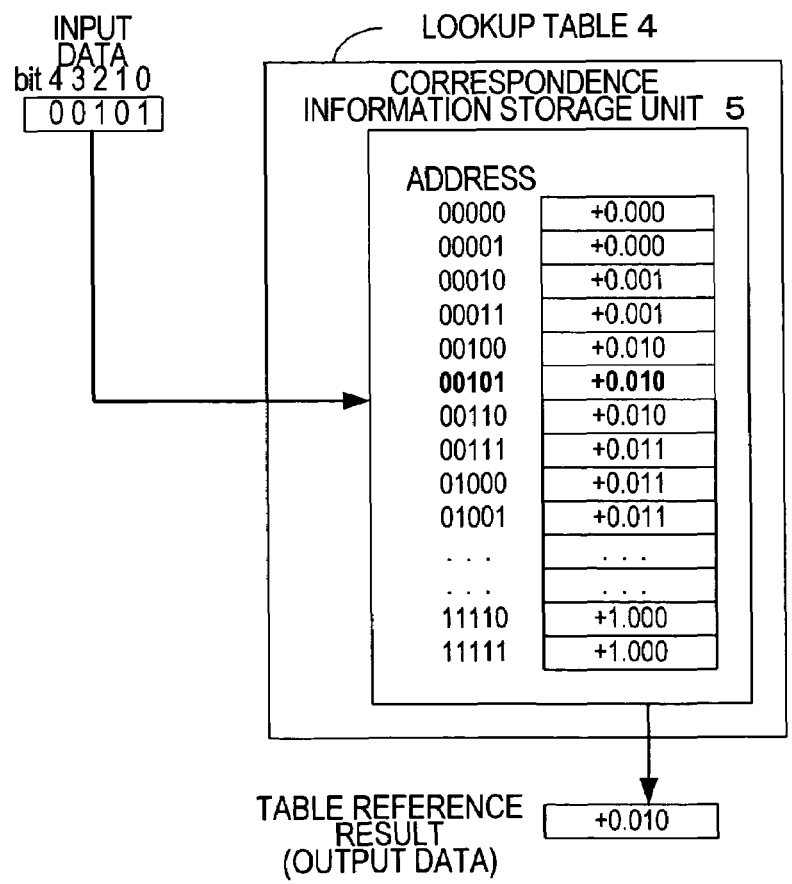

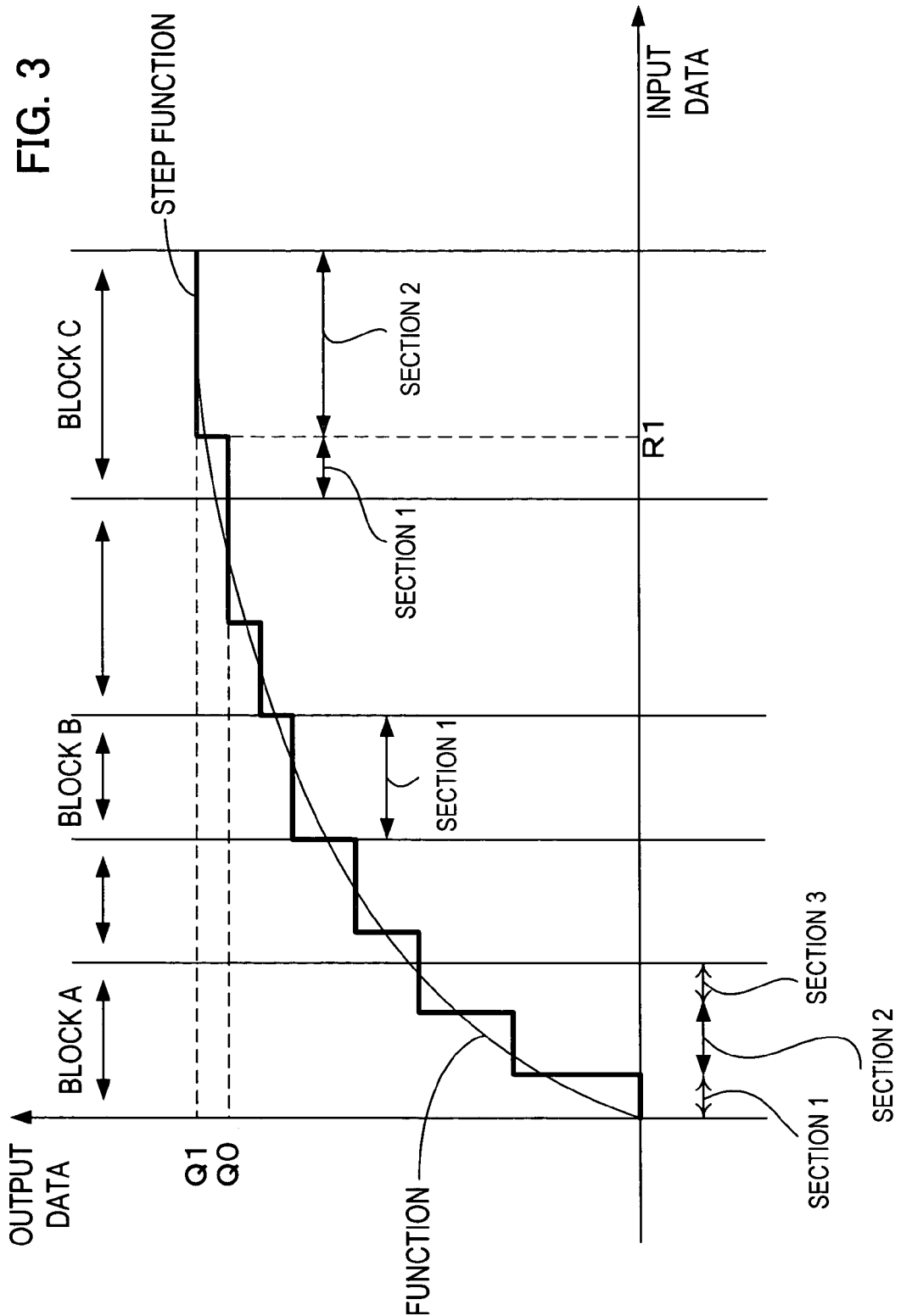

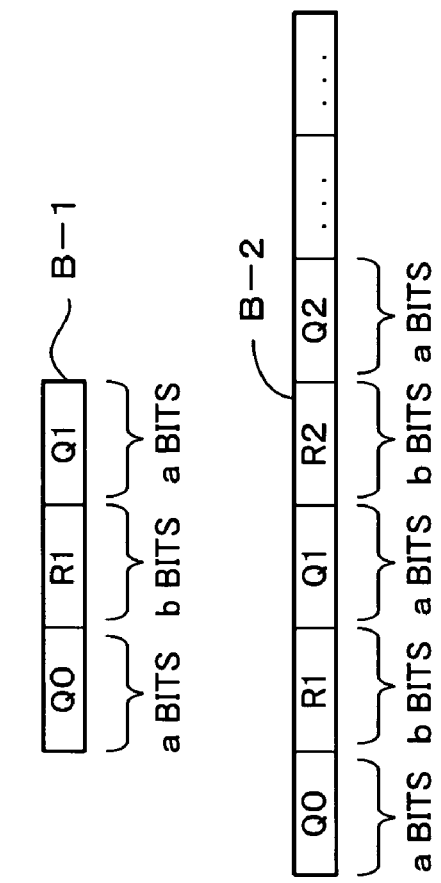

FIG. 5

| ANGLE (2πi/128) | INPUT DATA (i) = ADDRESS | | OUTPUT DATA (sin(2πi/128)) | | | | |
|---|---|---|---|---|---|---|---|
| DECIMAL VALUE | DECIMAL VALUE | BINARY VALUE | DECIMAL VALUE | BINARY VALUE | 8 DIVISION | 4 DIVISION | 6 DIVISION |
| 0 DEGREES | 0 | 00000 | 0.000 | +0.000 | +0.000 | +0.000 | +0.000 |
| | 1 | 00001 | 0.049 | +0.000 | | | +0.000 |
| | 2 | 00010 | 0.098 | +0.001 | +0.001(+0.001) | (+0.001) | +0.001 |
| | 3 | 00011 | 0.147 | +0.001 | | | |
| | 4 | 00100 | 0.195 | +0.010 | +0.010 | (+0.010) | +0.010 |
| | 5 | 00101 | 0.243 | +0.010 | | | |
| | 6 | 00110 | 0.290 | +0.010 | | | |
| | 7 | 00111 | 0.337 | +0.011 | +0.011(+0.001) | (+0.011) | (+0.001) |
| | 8 | 01000 | 0.383 | +0.011 | +0.011 | +0.011 | +0.011 |
| | 9 | 01001 | 0.428 | +0.011 | | | |
| | 10 | 01010 | 0.471 | +0.100 | +0.100(+0.001) | (+0.001) | (+0.001) |
| | 11 | 01011 | 0.514 | +0.100 | | | |
| | 12 | 01100 | 0.556 | +0.100 | +0.100 | | |
| | 13 | 01101 | 0.596 | +0.101 | +0.101(+0.001) | (+0.010) | (+0.010) |
| | 14 | 01110 | 0.634 | +0.101 | | | |
| | 15 | 01111 | 0.672 | +0.101 | | | |
| 45 DEGREES | 16 | 10000 | 0.707 | +0.110 | +0.110 | +0.110 | +0.110 |
| | 17 | 10001 | 0.741 | +0.110 | | | |
| | 18 | 10010 | 0.773 | +0.110 | | | |
| | 19 | 10011 | 0.803 | +0.110 | | | |
| | 20 | 10100 | 0.831 | +0.111 | +0.111 | (+0.001) | (+0.001) |
| | 21 | 10101 | 0.858 | +0.111 | | | |
| | 22 | 10110 | 0.882 | +0.111 | | | |
| | 23 | 10111 | 0.904 | +0.111 | | | |
| | 24 | 11000 | 0.924 | +0.111 | +0.111 | +0.111 | |
| | 25 | 11001 | 0.942 | +1.000 | +1.000(+0.001) | (+0.001) | (+0.010) |
| | 26 | 11010 | 0.957 | +1.000 | | | |
| | 27 | 11011 | 0.970 | +1.000 | | | |
| | 28 | 11100 | 0.981 | +1.000 | +1.000 | | |
| | 29 | 11101 | 0.989 | +1.000 | | | |
| | 30 | 11110 | 0.995 | +1.000 | | | |
| | 31 | 11111 | 0.999 | +1.000 | | | |
| 90 DEGREES | 32 | 1 00000 | 1.000 | +1.000 | | | |
| | 33 | 1 00001 | 0.999 | +1.000 | 53 | 54 | 55 |
| | 34 | 1 00010 | 0.995 | +1.000 | | | |
| | 35 | 1 00011 | 0.989 | +1.000 | ... | | |
| | 36 | 1 00100 | 0.981 | +1.000 | | | |
| | ... | ... | ... | ... | | | |
| | ... | ... | ... | ... | | | |

LOOKUP TABLE AND DATA ACQUISITION METHOD

CROSS-REFERENCE TO RELATED APPLICATIONS

This application is a continuation of international application PCT/JP2003/009851, filed on Aug. 4, 2003, now pending, herein incorporated by reference.

TECHNICAL FIELD

The present invention relates to a lookup table to be referred to acquire the output data corresponding to the input data, the data acquisition method, and the information processing apparatus.

BACKGROUND ART

In general information processing devices, a lookup table, which contains a correspondence information storage unit, such as a memory storing computation result (output data) corresponding to the input data in each address, may be used to make computing processing to determine the output data corresponding to the input data faster. By referring to the address corresponding to the input data and acquiring the output data stored in an address, the output data corresponding to the input data is more quickly accessed than actually computing it.

FIG. 1 is an example of a system where a lookup table is used. This example shows the status when receive signals are demodulated in CDMA (Code Division Multiple Access) in a mobile communication system or in OFDM (Orthogonal Frequency Division Multiplexing) in a next generation mobile communication system. When signals are demodulated, Fourier transform or fast Fourier transform is performed to extract the frequency component of the receive signals, and to make such a transform faster the values of sine and cosine must be acquired at high speed.

In FIG. 1, the signal received by the antenna 1 are transformed by the A/D (analog/digital) converter 2, and when the processing to extract the frequency component is performed in the Fourier transform device 3 after this, the angle information is input and the correspondence information storage unit 5 in the lookup table 4 is referred to to determine the sine and cosine values corresponding to the angle information as the output data.

FIG. 2 is a diagram depicting the conventional lookup table. The trigonometric function value corresponding to the angle information of the input data has been stored in each address as the output data in advance. In the example in FIG. 2, 5-bit input data (00101) is input to the lookup table 4, and the address (00101) is referred to by the correspondence information storage unit 5, and as a result the output data (+0.010) is acquired.

As FIG. 2 shows, in the case of a conventional lookup table where one address corresponds to one input data and one output data corresponds to that address, the memory capacity required for the lookup table increases as the addresses corresponding to the input data increase. Also as the number of bits used for the address increases, the memory capacity required for the lookup table increases. Therefore some methods to decrease the memory capacity required for the lookup table have been proposed (Japanese Patent Application Laid-Open No.H10-300517, No.H5-183443 and No.2000-341546).

Japanese Patent Application Laid-Open No.H10-300517 discloses an interpolation circuit of an encoder where instead of referring to the lookup table using all the bits of the digital data to be input, the digital data to be input is divided into high order bits and low order bits, and high order bits are used for referring to the lookup table, and low order bits are used for interpolation calculation. According to Japanese Patent Application Laid-Open H10-300517, the memory capacity required for the lookup table can be decreased compared with prior art since low order bits are not used for referring to the lookup table.

However even if the number of bits of an address is decreased and the memory capacity required for the lookup table is decreased by decreasing the number of addresses, still only one output data corresponds to one address in the lookup table, and if the number of high order bits increases, the memory capacity required for the lookup table still increases, therefore improvement was necessary for the conventional approach of decreasing memory capacity. In the case of Japanese Patent Application Laid-Open No.H5-183443 and No.2000-341546 as well, only one output data corresponds to one address, where the same problem as Japanese Patent Application Laid-Open No.H10-300517 remains.

DISCLOSURE OF THE INVENTION

With the foregoing in view, it is an object of the present invention to provide a lookup table, data acquisition method, and information processing apparatus wherein the lookup table for referring to the address corresponding to the input data, to acquire the output data corresponding to the input data, and simply corresponding the output data to this address, is improved so that the required memory capacity is further decreased.

The above object is achieved by providing a lookup table according to the present invention, that is a lookup table for outputting second data corresponding to first data which has been input, having a correspondence information storage, a plurality of first data and a plurality of second data which correspond to a plurality of first data respectively are prepared in advance; a first predetermined number of bits are set as a representative address in each of the first data; a second predetermined number of bits not used for the representative address are set as a relative address in each of the first data; the plurality of first data is classified into a plurality of blocks by the representative address; the representative address is corresponded to each of the plurality of blocks; a range, where the second data corresponding to the first data contained in each of the plurality of blocks takes a same value continuously, is regarded as one section, and each of the plurality of blocks is divided into at least one section, where a combination of the second data for each section in a block corresponding to the representative address out of the plurality of blocks and the relative address for specifying a position of the boundary of the section is stored in an address specified by the representative address respectively, an address specified by the representative address of the first data which has been input is referred to, and the combination which corresponds thereto is output; a relative address comparison unit connected to the correspondence information storage unit for comparing the relative address of the first data which has been input with the relative address contained in the combination, and specifying the section containing the first data which has been input; and an information selection unit connected to the correspondence information storage unit and the relative address comparison unit, for outputting the second data corresponding to the section containing the first data which has been input out of the second data for each section contained in the combination.

The above object is also achieved by providing a lookup table according to the present invention, that is a lookup table for outputting second data corresponding to the first data which has been input, having a correspondence information storage unit, a plurality of first data and a plurality of second data which correspond to the plurality of the first data respectively are prepared in advance, a representative address is corresponded according to the most significant bit position out of the bits storing 1 in each of the first data, a predetermined number of bits out of the bits lower than the most significant bit position are set as a relative address in each of the first data, the first data is classified into a plurality of blocks by the representative address, the representative address is corresponded to each of the plurality of blocks, a range, where the second data corresponding to the first data contained in each of the plurality of blocks takes a same value continuously, is regarded as one section, and each of the plurality of blocks is divided into at least one section, where a combination of the second data for each of the sections in a block corresponding to the representative address out of the plurality of blocks and the relative address for specifying a position of the boundary of the section is stored in an address specified by the representative address respectively, an address specified by the representative address of the first data which has been input is referred to, and the combination which corresponds thereto is output; a relative address comparison unit connected to the correspondence information storage unit for comparing the relative address of the first data which has been input and the relative address contained in the combination, and specifying the section containing the first data which has been input; and an information selection unit connected to the correspondence information storage unit and the relative address comparison unit, for outputting the second data corresponding to the section containing the first data which has been input out of the second data for each section contained in the combination.

Also the above object is achieved by providing a lookup table according to the present invention, wherein the correspondence information storage unit stores a combination of representative information selected from the second data for each of the sections in a block corresponding to the representative address out of the plurality of blocks, modification information which is a difference between a second data for each of the sections and the representative information, and the relative address for specifying a position of the boundary of the section, instead of storing the combination of the second data for each of the sections in a block corresponding to the representative address out of the plurality of blocks and the relative address for specifying a position of the boundary of the section, and the information selection unit selects the modification information corresponding to a section containing the first data which has been input out of the modification information contained in the combination, and outputs data after the representative information is added to the selected modification information as a second data, instead of outputting the second data corresponding to the section containing the first data which was input out of the second data for each of the sections contained in the combination.

The above object is also achieved by providing a lookup table according to the present invention, further having storage unit connected to the information selection unit, wherein the correspondence information storage unit stores a combination of representative information selected from the second data for each of the sections in a block corresponding to the representative address out of the plurality of blocks, and the relative address for specifying a position of the boundary of the section, instead of storing the combination of the second data for each of the sections in a block corresponding to the representative address out of the plurality of blocks and the relative address for specifying a position of the boundary of the section, the storage unit stores a value to be added to the representative information according to the section containing the first data as modification information, and the information selection unit selects the modification information stored in the storage unit according to the section containing the first data which has been input, and outputs data after the representative information is added to the selected modification information as a second data, instead of outputting the second data corresponding to the section containing the first data which has been input, out of the second data for each of the sections contained in the combination.

The above object is also achieved by a lookup table according to the present invention, wherein two or more correspondence information storage units exists, a third predetermined number of bits, out of the bits not used for the representative address and the relative address in the first data which has been input, are set as a table selection address, and the correspondence information storage unit selected from the plurality of correspondence information storage units is used based on the table selection address.

The above object is also achieved by a data acquisition method according to the present invention, that is a data acquisition method for acquiring second data corresponding to first data which has been input, having the steps of: preparing a plurality of first data and a plurality of second data which correspond to the plurality of first data respectively in advance, a first predetermined number of bits are set as a representative address in each of the first data, a second predetermined number of bits not used for the representative address are set as a relative address in each of the first data, the plurality of first data is classified into a plurality of blocks by the representative address, the representative address is corresponded to each of the plurality of blocks, a range, where the second data corresponding to the first data contained in each of the plurality of blocks takes a same value continuously, is regarded as one section, each of the plurality of blocks is divided into at least one section, and the second data for each of the sections is corresponded to each of the plurality of blocks; specifying the block containing the first data which has been input out of the plurality of blocks using the representative address of the first data which has been input; specifying the section containing the first data which has been input out of the sections contained in the specified block using the relative address of the first data which has been input; and acquiring the second data corresponded to the specified section.

The above object is also achieved by providing a data acquisition method according to the present invention, that is a data acquisition method for acquiring second data corresponding to first data which has been input, having the steps of: preparing a plurality of the first data and a plurality of the second data which correspond to the plurality of first data respectively in advance, a representative address is corresponded according to the most significant bit position out of bits storing 1 in each of the first data, a predetermined number of bits out of bits lower than the most significant bit position are set as a relative address in each of the first data, the first data is classified into a plurality of blocks by the representative address, the representative address is corresponded to each of the plurality of blocks, a range, where the second data corresponding to the first data contained in each of the plurality of blocks takes a same value continuously, is regarded as one section, and each of the plurality of blocks is divided into at least one section, and the second data for each of the sections is corresponded to each of the plurality of blocks; specifying a block containing the first data which has been input out of the plurality of blocks using the representative address of the first data which has been input; specifying a section containing the first data which has been input out of the sections contained in the specified block using the relative address of the first data which was input; and acquiring the second data corresponded to the specified section.

The above object is also achieved by providing a data acquisition method according to the present invention, wherein corresponding a representative information selected from the second data for each of the sections and the modification information, which is a difference between second data for each of the sections and the representative information, to the plurality of blocks respectively instead of corresponding the second data for each of the sections to the plurality of blocks respectively, and selecting the modification information corresponding to the specified section, acquiring a data after the representative information is added to the selected modification information is acquired as the second data, instead of acquiring the second data corresponded to the specified section.

The above object is achieved by providing an information processing apparatus to the present invention, that is an information processing apparatus, having a processing unit; a storage unit storing a combination of second data corresponding to a first address, and a second address determining a boundary of a section in which the second data, corresponding to first data, taking a same value is stored, a first portion of first data is set as the first address, and a second portion of the first data is set as the second address; a comparison unit comparing a second address of input first data and a second address included within a combination retrieved from the table unit by using a first address corresponding to the input first data, to determine a section in which the input first data is included; and a selection unit selecting second data corresponding to the section determined by the comparison unit.

The above object is achieved by providing a lookup table according to the present invention, that is a look-up table stores second data corresponding to first data, having a storage unit for storing a combination of second data corresponding to a first address, and a second address specifying a boundary of a section in which the second data corresponding to fist data and taking a same value is stored, a first portion of the first data having a predetermined number of bits is set as the first address, and a second portion of the first data having a second predetermined number of bits is set as the second address; a comparison unit comparing a second address of input first data and a second address included within the combination read from the storage unit by using a first address corresponding to the input first data, to determine a section in which the input first data is included; and a selection unit selecting second data corresponding to the section determined by the comparison unit.

The above object is achieved by a data acquisition method to the present invention, that is a data acquisition method for acquiring second data corresponding to input first data, having the steps of: determining a block in which input first data is included, from a plurality of blocks, by using a first portion of the input first data, each of the blocks stores first data classified by the first sets of bits; determining a section of determined block in which the input first data is included from a plurality of sections, each of the sections stores second data taking a same value corresponding to first data, by using a second portion of the input first data; and outputting a second data corresponding to the determined section.

BRIEF DESCRIPTION OF THE DRAWINGS

FIG. 1 is a diagram depicting an example of a system where a lookup table is used;

FIG. 2 is a diagram depicting a conventional lookup table;

FIG. 3 is a diagram depicting an overview of an embodiment of the present invention;

FIG. 4A is a diagram depicting an example of a correspondence information storage unit; FIG. 4B is a diagram depicting a storage example of information on block;

FIG. 5 is a numeric table of the sine functions to be used for an embodiment of the present invention;

BEST MODE FOR CARRYING OUT THE INVENTION

Figure 6A:
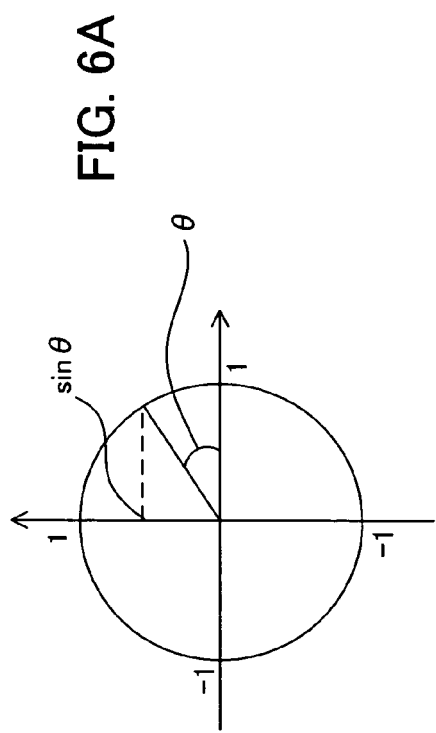
FIG. 6A is a diagram showing relationship between sin θ and θ.

Embodiments of the present invention will now be described according to the accompanying drawings. The technical scope of the present invention, however, shall not be limited by these embodiments.

FIG. 3 is a diagram depicting an overview of an embodiment of the lookup table of the present invention. FIG. 3 describes the relationship between the input data and the output data, and shows the status of approximating a function by a step function. As a result of referring to the lookup table, the output data (step function values) corresponding to the input data is acquired as a value (approximate value) of a function.

Conventionally the output data corresponding to each input data is stored in each address, where memory capacity is wasted. Therefore in an embodiment of the present invention, the input data is divided into a plurality of blocks, and each block is further divided into a plurality of sections regarding a range, where a same output data is stored within the block, as one section.

The size of the block is not limited, and the number of sections included in a block are all different. For example, block A is divided into three sections, block B contains only one section, and block C is divided into two sections.

And as FIG. 4A shows, each block is corresponded to an address of the correspondence information storage unit included in the lookup table, and information on the corresponding block is stored in each address. The correspondence information storage unit is storage means, such as ROM and RAM, and the information stored in the corresponding address is referred to by specifying the address. As an information on the block, information for specifying a section existing in the corresponding block and output data in that section are stored. For information for specifying a section, a position at which the output data changes, in other words, the boundary position to be a boundary of each section, for example, is used.

In the case of block C in FIG. 3, for example, block C is divided into section 1 and section 2 by the input data R1, where the corresponding output data is Q0 in section 1 and the corresponding output data is Q1 in section 2, so as FIG. 4B shows, a bits of Q0, b bits of R1 and a bits of Q1 are included as information on block C (B-1). a and b are natural numbers and Q0, Q1 and R1 are in no special order. If a block is divided into three or more sections, information to be stored also increases according to the number of sections (B-2). In this case as well, information to be stored has no special order. The boundary position (Rx) to be a boundary of each section to be used in FIG. 4B is a position information specified as a relative position in the block, or a position information that the boundary position is specified by input data as an absolute position.

By using the above mentioned lookup table, the number of bits required for each address increases compared with prior art, but the number of addresses decreases from the number of input data (prior art) to the number of blocks (present embodiment), so the overall memory capacity can be further decreased.

Figure 6B:
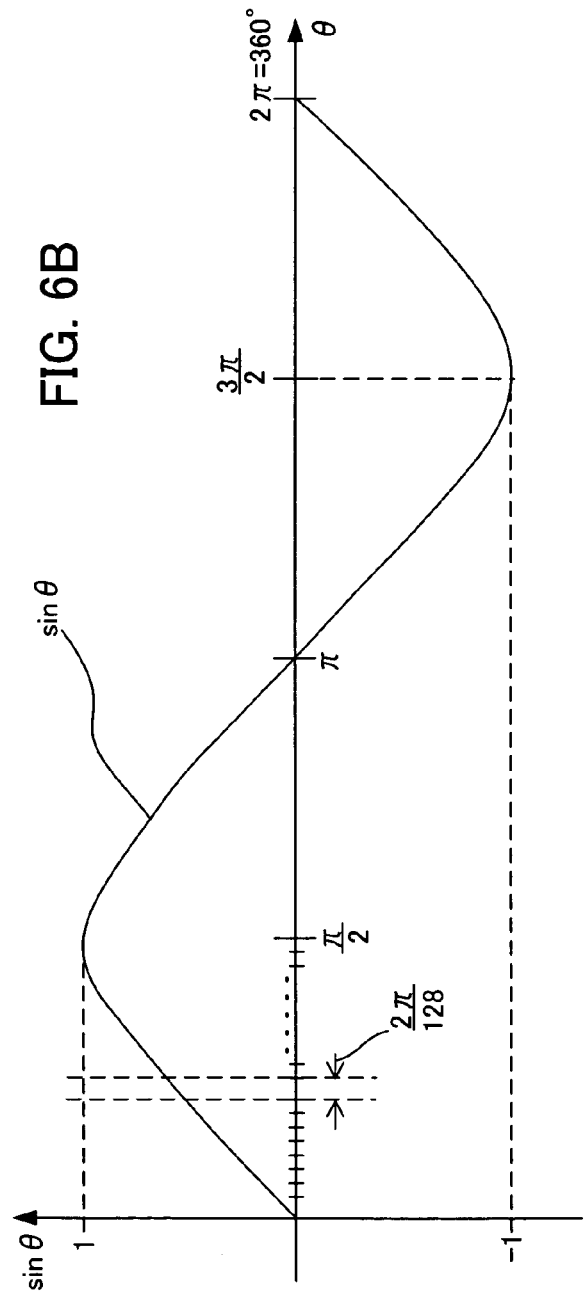
FIG. 6B is a diagram showing the sine functions to be used for an embodiment of the present invention.

Now an embodiment of the lookup table will be described more specifically. FIG. 5 is a numeric table of the sine functions to be used in an embodiment of the present invention, and this shows the sine function values up to about 90 degrees in the case when the range from 0° to 360° in the sine functions in FIG. 6 is equally divided into 128.

For simplification, the address is limited to 32 input data which can be represented by 5 bits in the present invention. The output data 52 is represented by 5 bits (sign 1 bit+integer section 1 bit+decimal section 3 bits). 0 of the sign bit means a positive sign and 1 is a negative sign.

In FIG. 5, the output data 52 corresponding to the input data 51 is stored in the row of decimal values. For example, when the angle is 0 degrees (input data is 0), the sine value is 0.000, when the angle is 45 degrees (input data is 16), the sine value is 0.707, and when the angle is 90 degrees (input data is 32), the sine value is 1.000.

Binary values corresponding to each numeric value are listed in the row next to the decimal values of the input data 51 and the output data 52. The decimal place n (n is a natural number) of the binary value corresponds to (−n)th power of 2.

In the output data represented by binary values, a same value is stored for a plurality of input data 51 because of the conversion from a decimal to a binary value. Also since the change of the sine function value is relaxed at around 90 degrees, the range where a same value is stored becomes wider as the angle approaches 90 degrees. According to the change of the binary values, values are incremented in steps, 0.001 more each time, as the angle approaches 90 degrees.

Now some examples of a method of dividing the input data 51 are shown. Row 53 in the 8 division in FIG. 5 is the case when 32 input data, between 0 degrees and 90 degrees, is divided into eight blocks, four input data each. The high order 3 bits of input data included in each block are common. For example, in the first block, the high order 3 bits 000 are common. In other words, each block of the 8 divisions is a block when the input data is classified by the high order 3 bits.

Each block is further divided into a plurality of sections according to the change of the output data. For example, in the first block, the output data +0.000 in the first address (00000) changes to +0.001 in the address 00010. Therefore the first block is divided into two sections by the address 00010. In the fifth block, the output data +0.110 in the first address (10000) does not change within the block, so the number of sections is 1.

Since the number of input data contained in each block is 4, if 2-bit addresses (00, 01, 10, 11) are corresponded thereto, the position at which the output data changes within the block can be specified by these 2-bit addresses. The address for specifying the position in the block is called a relative address. In other words, in the first block, the block is separated into two sections by the relative address 10. The numeric in parenthesis shows the difference from the output data in the first address in each block.

In the case of the 8 divisions, the high order 3 bits of the address are common in each block, so the block can be specified using the high order 3 bits of the address. The 2 bits of the relative address match the low order 2 bits of the address. In other words, in the case of the 8 divisions, the block is specified by the low order 3 bits of the address, the position in the specified block is specified by the low order 2 bits (relative address), and the output data corresponding to the input data can be acquired.

Row 54 of the 4 divisions in FIG. 5 is the case when 32 addresses are divided into 4 blocks, 8 addresses each. In the case of the 4 divisions, the high order 2 bits of the address of each block are common. In other words, each block of the 4 divisions is a block when the address is classified by the high order 2 bits. For example, the high order 2 bits of the address of the first block is 00, which is common. The numeric inside the parenthesis is a difference between the output data in the first address of each block and each output data.

Also the relative address, the 3 bits from the beginning of each block, matches the low order 3 bits of the address. In other words, in the case of the 4 divisions, just like the case of the 8 divisions, the block is specified by the high order 2 bits of the address, and the position within the specified block is specified by the low order 3 bits (relative address).

Row 55 of the 6 divisions in FIG. 5 is the case when 32 addresses are divided into 6 blocks. Unlike the cases of the 8 divisions and 4 divisions, the addresses are not divided into equal widths. The numeric inside the parenthesis is a difference from the output data in the first address of each block.

If x is an arbitrary bit which takes 0 or 1, depending on which bit from the high order bit where 1 is stored first, then the addresses of each block are classified into 00000 (1 is not included), 00001 (fifth bit is 1), 0001x (fourth bit is 1), 001xx (third bit is 1), 01xxx (second bit is 1) and 1xxxx (first bit is 1). In other words, each block of the 6 divisions is a block classified by an address based on the above mentioned classification method.

In the case of the 6 divisions as well, the block corresponding to the address (the input data) can be specified by the above classification. If a maximum of 4 bits of a relative address is corresponded from the beginning of each block according to the number of "xs", the position in the block can be specified.

If the input data is divided into a plurality of blocks as mentioned above, a block to which the input data (address) belongs to and the section in the block containing this input data can be specified, then the output data corresponding to the section can be specified.

Now the state where the memory capacity required for the lookup table is decreased compared with prior art and the state where the output data corresponding to the input data can be acquired with the same accuracy as prior art by storing information on the blocks divided as above in each address will be described.

Figure 7:
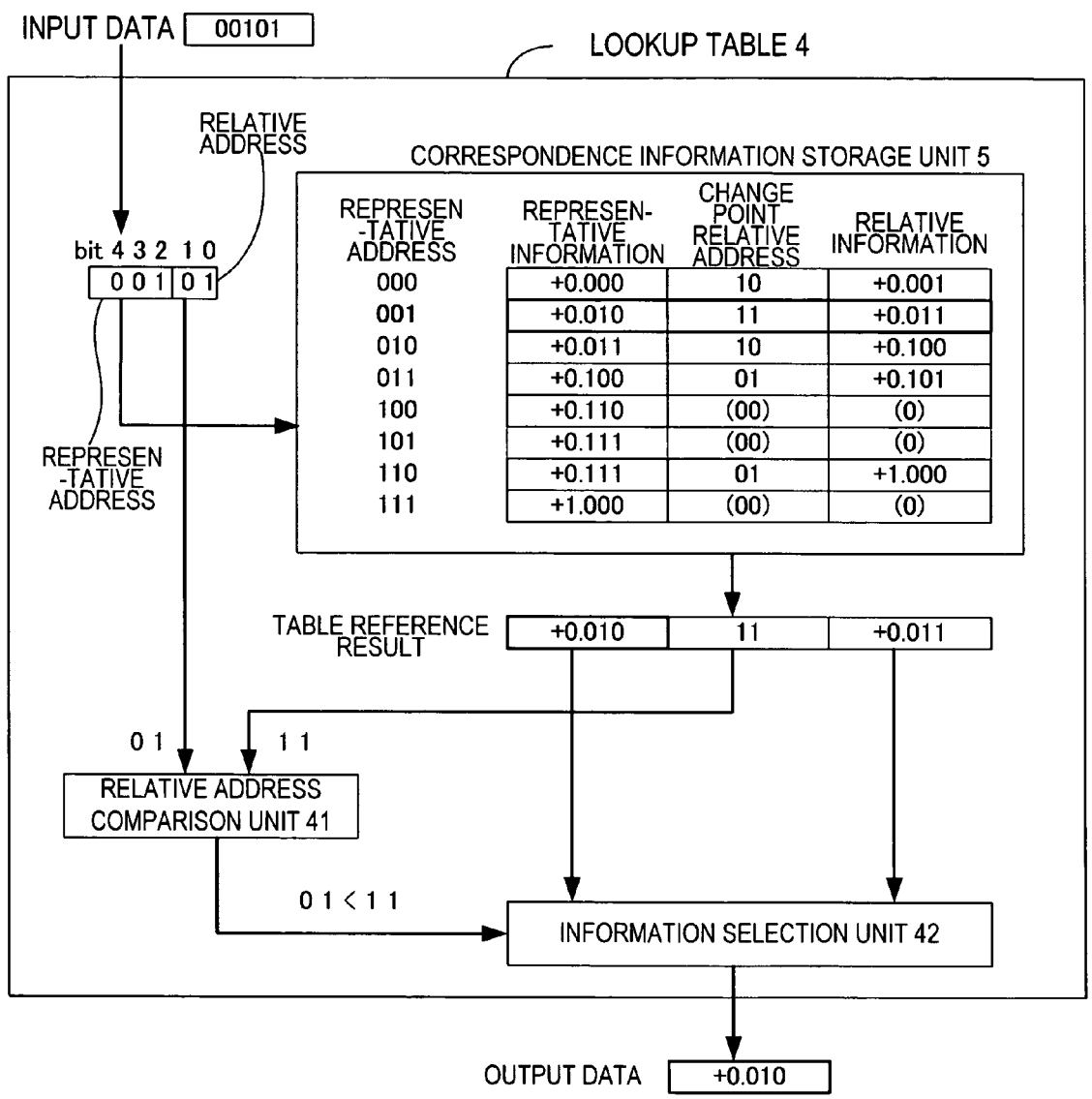
FIG. 7 is a diagram depicting the first embodiment of the present invention.

FIG. 7 is a block diagram of the lookup table 4 depicting the first embodiment of the present invention. The first embodiment corresponds to the 8 divisions in FIG. 5. First the input data which is input to the lookup table 4 in FIG. 7 is divided into high order 3 bits and low order 2 bits. And the correspondence information storage unit 5 is referred to by the high order 3 bits.

In the correspondence information storage unit 5 in FIG. 7, the representative information, change point relative address and relative information are stored respectively for each representative address. The representative address is an address for specifying the block. By the representative address, the block of which the high order 3 bits of the input data are the same as the representative address is specified.

The representative information is output data arbitrarily selected from the output data corresponding to the input data contained in the block, and in this case it is the output data in the first address (relative address is 00) of the block. The relative address to indicate the position where the output data changes in the block is stored in the change point relative address. The relative information is all of information other than the representative information in the output data contained in the block For example, 000001000001 is stored in the representative address 000. The first five bits (00000) indicate the representative information (+ 0.000), the next 2 bits (10) indicate the change point relative address (10), and the last 5 bits (00001) indicate the relative information (+0.001). Therefore in the block corresponding to the representative address 000, the output data is +0.000 in the relative address 00 or 01, and the output data is +0.001 in the relative address 10 or 11, which is equal to or higher than the change point relative address (10). This corresponds to the first block in the row 53 of the 8 divisions in FIG. 5. The change point relative address 00 in the representative address 100 means that the output data in the block does not change, remaining as the representative information. This corresponds to the fifth block in the row 53 in the 8 divisions in FIG. 5.

When the correspondence information storage unit 5 is referred to by the high order 3 bits, the information stored in corresponding the representative address is acquired as the reference result. The relative address of the input data and the change point relative address contained in this reference result are input to a relative address comparison unit 41, and the relative address comparison unit 41 compares the relative address of the input data and the change point relative address as binary values, and inputs the result to the information selection unit 42.

By the comparison in the relative address comparison unit 41, it is judged whether the relative address is the change point relative address or higher. This means that it is judged in which section the relative address exists. For example, in the case of the block corresponding to the representative address 000, the block is divided into two sections by the relative address 10, and the output data is the representative information (+0.000) in the first half section, and the output data is the relative information (+0.001) in the latter half section, and the section to which the relative address belongs can be discerned by comparing the relative address with the change point relative address. According to the comparison result which is input, an information selection unit 42 selects the representative information as the output data if the relative address is lower than the change point relative address, and selects the relative information as the output data if the relative address is higher than the change point relative address, and outputs the data.

For example, it is assumed that the input data 00101 was provided. In FIG. 5 the corresponding output data is +0.010. The representative address (high order 3 bits) of the input data is 001, and the relative address (low order 2 bits) is 01.

First the correspondence information storage unit 5 is referred to by the representative address (001), and as the table reference result, the representative information (+0.010), the charge point relative address (11) and the relative information (+0.011) are acquired. Then in the relative address comparison unit 41, the relative address (01) and the change point relative address (11) are compared, and as a result of the comparison (01<11), it is known that the relative address of the input data is lower than the change point relative address. So the information selection unit 42 selects the representative information (+0.010), and outputs this.

Conventionally 5-bit output data is corresponded to each 5-bit address (32 addresses), so 32*5=160 bits of memory capacity is required, but according to the first embodiment, 5-bit representative information, 2-bit relative address and 5-bit relative information are corresponded to each 3-bit representative address (8 addresses), so the memory capacity can only be 8*(5+2+5)=96 bits. Thus using the lookup table where the required memory capacity is decreased compared to prior art, output data, the same as FIG. 5, can be acquired.

Figure 8:
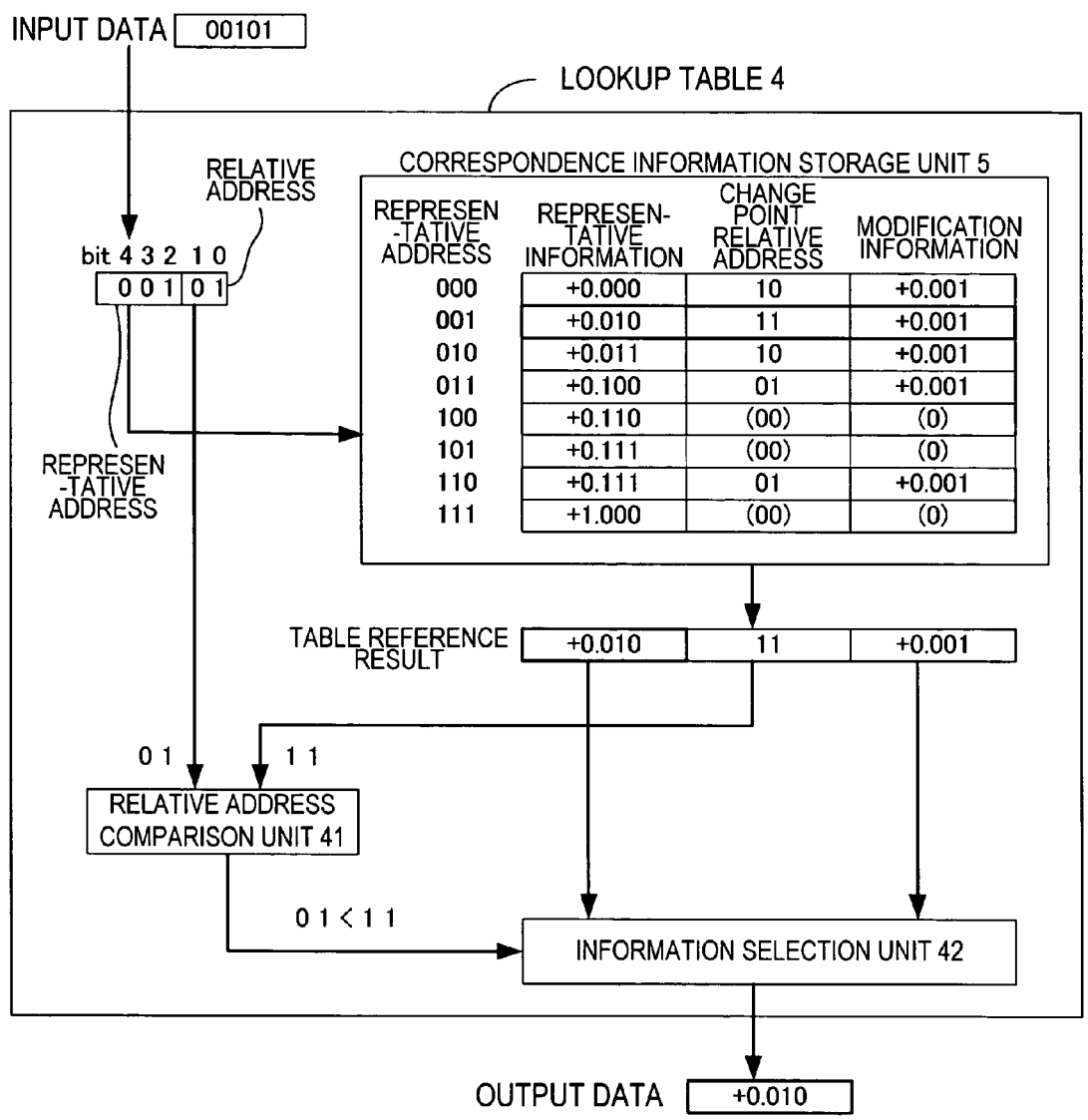
FIG. 8 is a diagram depicting the second embodiment of the present invention.

FIG. 8 is a block diagram of the lookup table 4 depicting the second embodiment of the present invention. The second embodiment corresponds to the 8 divisions in FIG. 5, where numerics in parenthesis are used. In other words, in the case of the first embodiment, the relative information is stored in each address of the correspondence information storage unit 5, but in the case of the second embodiment, the difference between each the output data and the representative information is stored.

The input data which is input to the lookup table 4 in FIG. 8 is divided into high order 3 bits and low order 2 bits. And the correspondence information storage unit 5 is referred to by the high order 3 bits.

In the correspondence information storage unit 5 in FIG. 8, the representative information, the change point relative address and modification information are stored respectively for each representative address. Just like the first embodiment, the representative address is an address for specifying the block, and each block is divided so that the high order 3 bits of the address become common. The representative information and the change point relative address are the same as those of the first embodiment so the description thereof is omitted. The modification information is the difference between each output data and the representative information.

For example, in the block corresponding to the representative address 000, the output data is +0.000 in the relative address 00 or 01, and in the relative address 10 or 11, which is equal to or higher than the change point relative address (10), the output data is +0.001, that is the representative information +0.000 plus the modification information +0.001.

When the correspondence information storage unit 5 is referred to by the high order 3 bits, the information stored in corresponding the representative address is acquired as the reference result. The relative address of the input data and the change point relative address contained in the reference result of the correspondence information storage unit 5 are input to the relative address comparison unit 41, and the relative address comparison unit 41 compares the relative address of the input data and the change point relative address as binary values, and inputs the result to a information selection and addition unit 43. According to the comparison result which is input, the information selection and addition unit 43 selects 0 as the modification information (this means the difference is 0, and nothing is added) if the relative address is lower than the change point relative address, and selects +0.001 as the modification information if the relative address is equal to or higher than the change point relative address, and outputs a value after adding the modification information to the representative information as the output data.

For example, it is assumed that input data 00101 is provided. The representative address (high order 3 bits) of the input data is 001, and the relative address (low order 2 bits) is 01. First the correspondence information storage unit 5 is referred to by the representative address (001), and the representative information (+0.010), the change point relative address (11) and the modification information (+0.001) are acquired as the table reference result. Then in the relative address comparison unit 41, the relative address (01) and the change point relative address (11) are compared, and as a result of the comparison (01<11), it is known that the relative address of the input data is lower than the change point relative address. So the information selection and addition unit 43 outputs the representative information (+0.010) as is.

Conventionally 5-bit output data is corresponded to each 5-bit address (32 addresses), so 32*5=160 bits of memory capacity are required, but according to the second embodiment, 5-bit representative information, 2-bit relative address and 5-bit modification information are corresponded to each 3-bit representative address (8 addresses), so the memory capacity can only be 8*(5+2+5)=96 bits. Thus using the lookup table where the required memory capacity is decreased compared to prior art, output data the same as FIG. 5 can be acquired.

In the example of the lookup table used for the second embodiment, the effect is no different from that of the first embodiment, since the modification information has the same number of bits as the representative information, but if the number of bits of the modification information, which is the difference, is lower than the number of bits of the representative information, the memory capacity can be further decreased by applying the second embodiment.

According to the modification information in FIG. 8, the difference in each block is all the same, +0.001, in the sine functions in FIG. 5 used for the present embodiment, so it is unnecessary to store the modification information in the correspondence information storage unit 5, and the memory capacity can be further decreased. This state will be described in FIG. 9.

Figure 9:
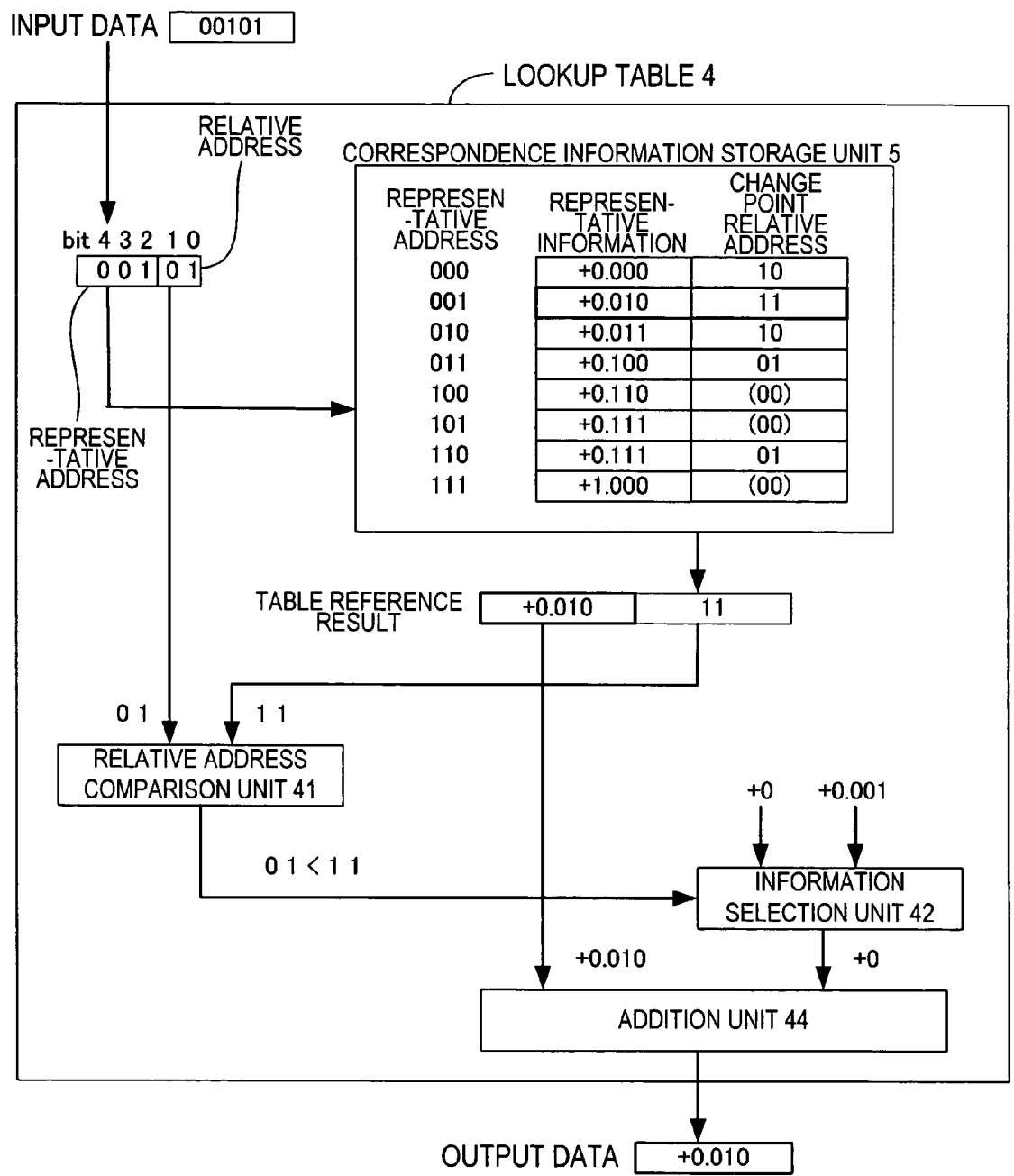
FIG. 9 is a diagram depicting a variant form of the second embodiment of the present invention.

FIG. 9 is a block diagram of the lookup table depicting a variant form of the second embodiment of the present invention. Since this is a variant form of the second embodiment, description on sections common with the second embodiment in FIG. 9 will be omitted.

The input data which was input to the lookup table 4 in FIG. 9 is divided into high order 3 bits and low order 2 bits. And the correspondence information storage unit 5 is referred to by the high order 3 bits. In the correspondence information storage unit 5 in FIG. 9, only the representative information and the change point relative address, out of the information stored in the correspondence information storage unit 5 of the second embodiment (FIG. 8), are stored.

The relative address of the input data and the change point relative address contained in the reference result of the correspondence information storage unit 5 are input to the relative address comparison unit 41, and the relative address comparison unit 41 compares the relative address of the input data and the change point relative address as binary values, and inputs the result to the information selection unit 42.

The information selection unit 42 has a register and stores the modification information (+0.001) in the register, and inputs the modification information (+0.001) to an addition unit 44 only when the relative address is higher than the change point relative address according to the comparison result which was input. The addition unit 44 adds the representative information contained in the reference result of the correspondence information storage unit 5 and selection result, and outputs the addition result as output data.

Conventionally 5-bit output data is corresponded to each 5-bit address (32 addresses), so 32*5=160 bits of memory capacity is required, but according to the variant form of the second embodiment, 5-bit representative information and 2-bit relative address are corresponded to each 3-bit representative address (8 addresses), so the memory capacity can only be 8*(5+2)=56 bits. This indicates a further decrease of the memory capacity even compared with the second embodiment (96 bits). Thus using the lookup table where the required memory capacity is decreased compared to prior art, output data the same as FIG. 5 can be acquired.

In FIG. 9, the information selection and addition unit 43 of the second embodiment is divided into the information selection unit 42 and the addition unit 44, but these can be one unit. On the other hand, the information selection and addition unit 43 in FIG. 8 can also be divided into two units, as shown in FIG. 9.

Figure 10:
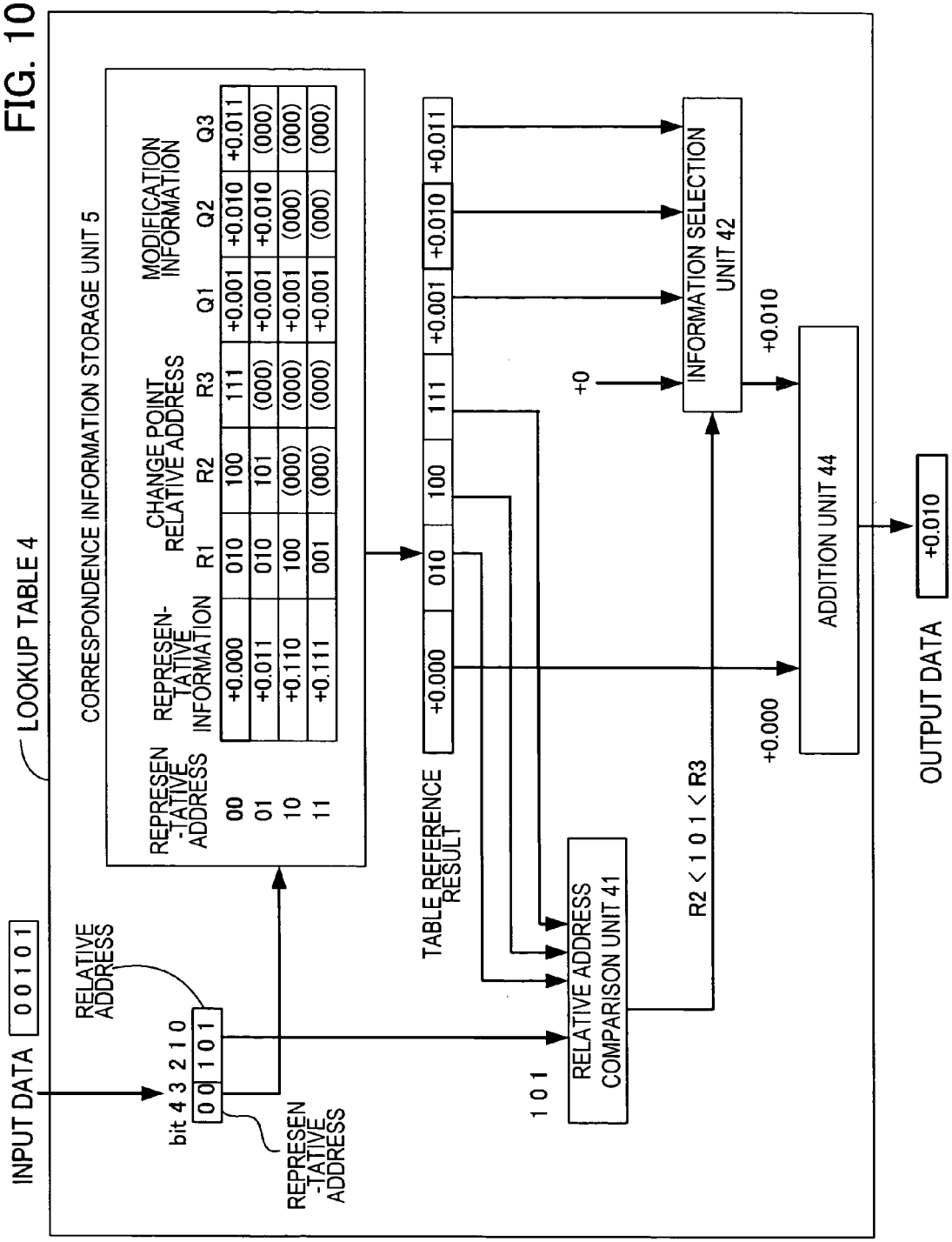
FIG. 10 is a diagram depicting the third embodiment of the present invention.

FIG. 10 is a block diagram of the lookup table depicting the third embodiment of the present invention. The third embodiment corresponds to the 4 divisions in FIG. 5.

In the case of the 4 divisions, the block can be specified by the high order 2 bits of the input data, but first the input data, which was input to the lookup table 4 in FIG. 10, is divided into high order 2 bits and low order 3 bits. And the correspondence information storage unit 5 is referred to by the high order 2 bits.

In the correspondence information storage unit 5 in FIG. 10, the representative information, the change point relative address and the modification information are stored respectively for each block corresponding to the representative address. Unlike the 8 divisions in the first and second embodiments, in the case of the 4 divisions, a block, which is divided into a plurality of sections, exists.

The representative information, the change point relative address and the modification information are the same as the second embodiment, so description thereof is omitted. Depending on the block, a plurality of change points exists, and three relative addresses (R1, R2, R3) and three modification information (Q1, Q2, Q3) can be stored according to the maximum number of change points.

For example, 29 (5+3*3+5*3) bits of 00000010100111000010001000011 is stored in the representative address 00. The first 5 bits (00000) are the representative information (+0.000), the next 3 bits (010) are the first change point relative address R1, the next 3 bits (100) are the second change point relative address R2, the next 3 bits are the third change point relative address R3 (111), the next 5 bits (00001) are the first modification information (+0.001), the next 5 bits are the second modification information (+0.010), and the last 5 bits are the third modification information (+0.011).

The block corresponding to the representative address 00, which has three change points, is divided into four sections. In the first section (relative address<R1), the output data is +0.000 (representative information), in the second section (R1≦relative address<R2) the output data is +0.001 (representative information+first modification information Q1 (+0.001)), in the third section (R2≦relative address<R3), the output data is +0.010 (representative information+second modification information Q2 (+0.010)), and in the fourth section (R3≦relative address) the output data is +0.011 (representative information+third modification information Q3 (+0.011)). This corresponds to the first block in the row 54 of the 4 divisions in FIG. 5.

The block corresponding to the representative address 10, which has only one change point, is divided into two sections. In other words, in the section where the relative address is lower than R1, the output data is +0.110 (representative information), and in the section where the relative address is R1 or higher, the output data is 0.111 (representative information+ Q1). The change point relative address 000 means that the output data in the block no longer changes. This block corresponds to the third block in the 8 divisions in FIG. 5.

When the correspondence information storage unit 5 is referred to by the high 2 bits, the information stored in the corresponding representative address is acquired as the reference result. The relative address of the input data and the change point relative address contained in the reference result of the correspondence information storage unit 5 are input to the relative address comparison unit 41, and the relative address comparison unit 41 judges the section containing the relative address, and inputs the result to the information selection unit 42. More specifically, the relative address and each change point relative address are compared as binary values, and the number of times when the relative address is judged as higher than the change point relative address is input to the information selection unit 42.

The information selection unit 42 selects the corresponding modification information according to the section containing the relative address. More specifically, +0 is selected if the number of times of input is 0, selects Q1 (+0.001) if once, Q2 (+0.010) if twice and Q3 (+0.011) if three times, and inputs the selection result to the addition unit 44. The addition unit 44 adds the representative information contained in the reference result of the correspondence information storage unit 5 and the selection result, and outputs the addition result as the output data.

For example, it is assumed that input data 00101 was provided. The representative address (high order 2 bits) is 00, and the relative address (low order 3 bits) is 101. First the correspondence information storage unit 5 is referred to by the representative address (00), and the representative information (+0.000), the change point relative addresses R1 (010), R2 (100) and R3 (111), and the relative information Q1 (+0.001), Q2 (+0.010) and Q3 (+0.011) are acquired as the table reference result. Then in the relative address comparison unit 41, the relative address (101) and the three change point relative addresses are compared, and as a result of comparison (R2<101<R3), it is known that the number of times, when the relative address of the input data becomes equal to or higher than the change point relative address, is twice. So the information selection unit 42 selects Q2 (+0.010), which is added to the representative information (+0.000) by the addition unit 44, and the result (+0.010) is output.

Conventionally 5-bit output data is corresponded to each 5-bit address (32 addresses), so 32*5=160 bits of memory capacity is required, but according to the third embodiment, a set of 5-bit representative information, three of 3-bit relative addresses and three of 5-bit modification information are corresponded to each 2-bit representative address (4 addresses), so the memory capacity can be only 4*(5+3*3+ 5*3)=116 bits. Thus using the lookup table where the required memory capacity is decreased compared to prior art, output data the same as FIG. 5 can be acquired.

In the third embodiment, the modification information is used as data stored in the correspondence information storage unit 5, but relative information, just like the first embodiment, can also be used. In this case, the information selection unit 42 selects the corresponding relative information according to the number of times when the relative address of the input data becomes equal to or higher than the change point relative address, for example.

According to the modification information in FIG. 10, it is known that value increases 0.001 at a time at all the change points in the sine function in FIG. 5 used for the present embodiment. So the modification information need not be stored in the correspondence information storage unit 5, and it is sufficient to add an appropriate number corresponding to the modification information according to the section to which the input data belongs, so the memory capacity can be further decreased. This state is described in FIG. 11.

Figure 11:
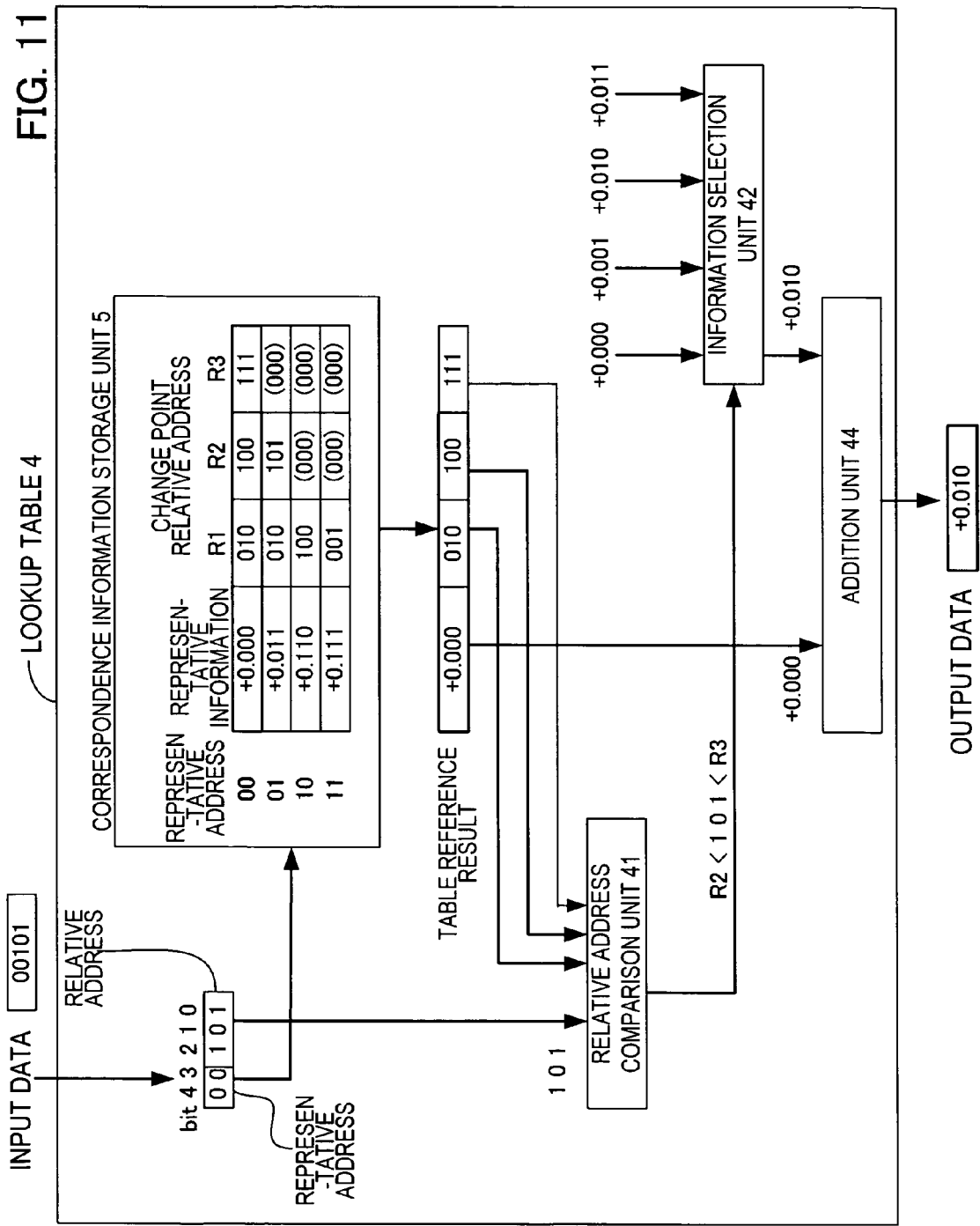
FIG. 11 is a diagram depicting a variant form of the third embodiment of the present invention.

FIG. 11 is a block diagram of the lookup table depicting a variant form of the third embodiment of the present invention. Since this is a variant form of the third embodiment, description on sections common with the third embodiment (FIG. 10) will be omitted.

The input data, which was input to the lookup table 4 in FIG. 11, is divided into high order 2 bits of the representative address and low order 3 bits of the relative address. And the correspondence information storage unit 5 is referred to by the representative address. Only the representative information and the change point relative address are stored in the correspondence information storage unit 5 in FIG. 11.

When the correspondence information storage unit 5 is referred to by the high order 2 bits, information stored in corresponding the representative address is acquired as the reference result. The relative address of the input data and the change point relative address contained in the reference result of the correspondence information storage unit 5 are input to the relative address comparison unit 41, and the relative address comparison unit 41 judges the section containing the relative address, and inputs the result to the information selection unit 42.

The information selection unit 42 selects corresponding the modification information according to the section containing the relative address. The information selection unit 42 has a register and stores information corresponding to the modification information (Q1, Q2, Q3) of each section in the register, selects +0 if it is the first section described in FIG. 7, +0.001 if the second section, +0.010 if the third section, and +0.011 if the fourth section, and inputs it to the addition unit 44. The addition unit 44 adds the representative information contained in the reference result of the correspondence information storage unit 5 and the selection result, and outputs the addition result as the output data.

Conventionally 5-bit output data is corresponded to each 5-bit address (32 addresses), so 32*5=160 bits of memory capacity is required, but according to the variant form of the third embodiment, a set of 5-bit representative information, and three 3-bit relative addresses is corresponded to each 2-bit representative address (4 addresses), so the memory capacity can be only 4*(5+3*3)=56 bits. This is a further decrease of memory capacity, even compared with the third embodiment (116 bits). Thus using a lookup table where the required memory capacity is decreased compared to prior art, output data the same as FIG. 5 can be acquired.

The section where 0 is enclosed by parenthesis in the correspondence information storage unit 5 up to the third embodiment (including the variant form) is information which has no meaning. For example, in the block corresponding to the representative address 100 in FIG. 7 according to the first embodiment, the output data is determined when it is judged that the input data belongs to this block, since the representative information (+0.110) remains unchanged.

In other words, in this case only the representative information has meaning. However just like the other blocks in FIG. 7, 12 bits (representative information 5 bits+2 bits of 0+5 bits of 0) are used in the representative address 100, where memory capacity is wasted.

This is because up to the third embodiment, a block is divided regardless the change of the output data. If more input data is contained in a block in the range where the output data changes little, and the number of change points contained in each block is equal in the range where the output data frequently changes, the memory capacity can be further decreased. Therefore the fourth embodiment, where the division of the block is changed according to the change of the output data, will be described.

Figure 12:
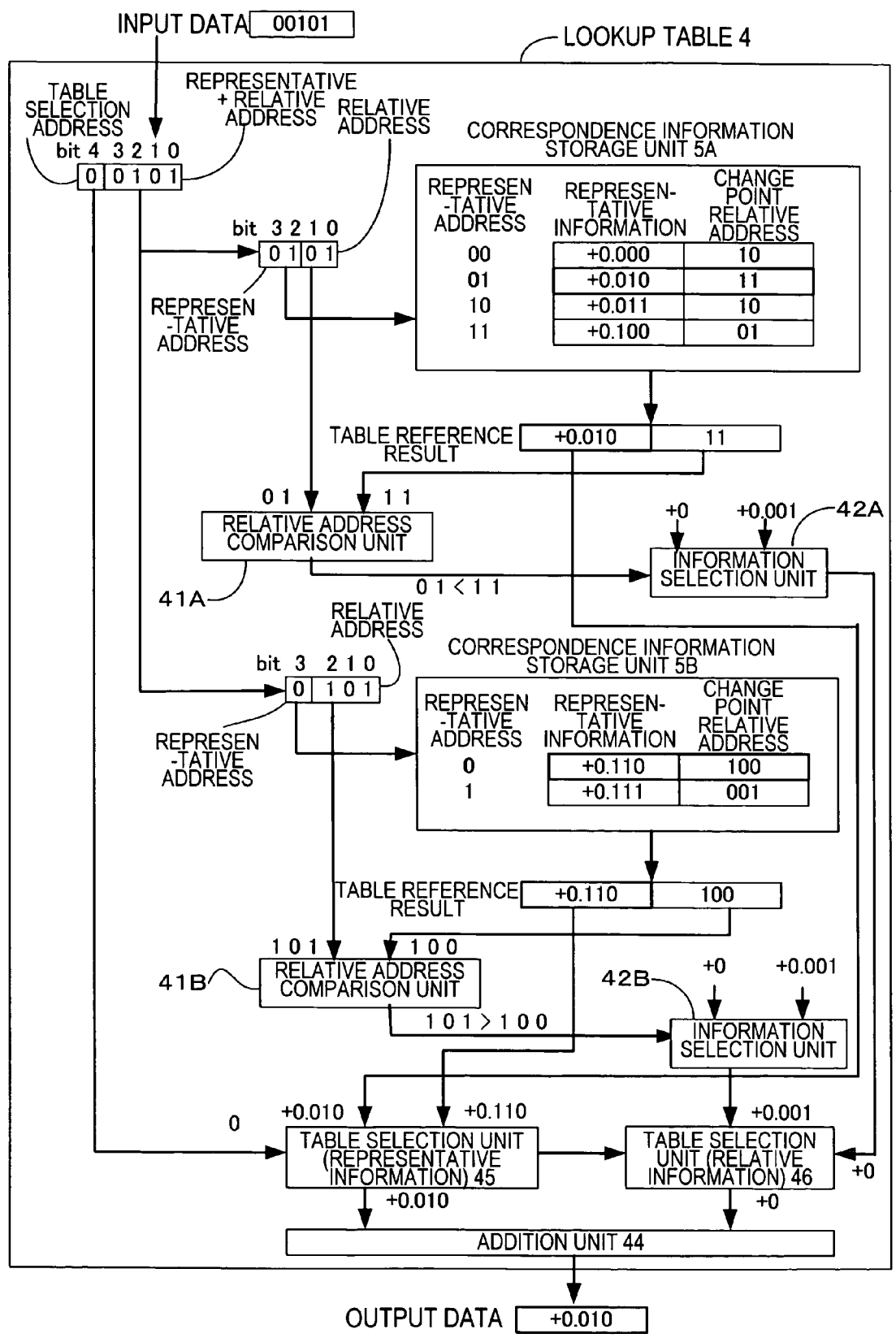
FIG. 12 is a diagram depicting the fourth embodiment of the present invention.

FIG. 12 is a block diagram of the lookup table depicting the fourth embodiment of the present invention. The fourth embodiment is a combination of the variant form of the second embodiment (FIG. 9) and the variant form of the third embodiment (FIG. 11), where an address is divided at every four addresses in the first half, and at every eight addresses in the latter half. Therefore there are two correspondence information storage units 5, the 5 bits of an address is divided into 1 bit for table selection and 4 bits of the representative and relative address, and the way of dividing the representative address and the relative address is changed by the correspondence information storage unit 5.

The input data, which was input to the lookup table in FIG. 12, is divided into high order 1 bit of the table selection address and low order 4 bits of the representative and relative address. The table selection address is used to select one of the two correspondence information storage units 5, and the representative and relative address is input to the first correspondence information storage unit 5A. Here the representative and relative address is divided into high order 2 bits of the first representative address and low order 2 bits of the first relative address. And the first correspondence information storage unit 5A is referred to by the first representative address.

In the first correspondence information storage unit 5A in FIG. 12, the representative information corresponding to the four addresses (representative addresses 000 to 011) in the first half of the variant form of the second embodiment (FIG. 9) and the change point relative address are stored.

For example in the block corresponding to the representative address 00, the output data is +0.000 in the relative address 00 or 01, and in the relative address 10 or 11, which is equal to or higher than the change point relative address (10), +0.001 is selected by the later mentioned first information selection unit 42A, and is added to the representative information by the addition unit 44, and +0.001 is finally output.

The first relative address and the change point relative address contained in the reference result of the correspondence information storage unit 5A are input to the first relative address comparison unit 41A, where it is judged whether the relative address is equal to or higher than the change point relative address. The relative address comparison unit 41A compares the relative address of the input data and the change point relative address as binary data, and inputs the result to the information selection unit 42A. The information selection unit 42A has a register in which stores the modification information (+0.001), and inputs +0 to a table selection unit 46 for modification information if the relative address is lower than the change point relative address according to the comparison result which was input, and inputs the modification information (+0.001) if the relative address is higher than the change point relative address.

The representative and relative address is also input to the second correspondence information storage unit 5B. Here the representative and relative address is divided into the high order 1 bit of the second representative address and the low order 3 bits of the second relative address. And the second correspondence information storage unit 5B is referred to by the second representative address.

In the second correspondence information storage unit 5B in FIG. 12, the representative information and the change point relative address corresponding to the 2 addresses (representative addresses 10 to 11) in the latter half of the variant form of the third embodiment (FIG. 11) are stored. There is only one change point, so R2 and R3 are unnecessary for the correspondence information storage unit 5 in FIG. 12.

For example, in the block corresponding to the representative address 0, the output data is +0.110 (representative information) in the section where the relative address is lower than the change point relative address (100), and in the section where the relative address is higher than 100, +0.001 is selected by the later mentioned second information selection unit 42B, and is added to the representative information by the addition unit 44, and +0.111 is finally output.

The second relative address and the change point relative address contained in the reference result of the correspondence information storage unit 5B are input to the second relative address comparison unit 41B, where it is judged whether the second relative address is equal to or higher than the change point relative address. The relative address comparison unit 41B compares the relative address of the input data and the change point relative address as binary values, and inputs the result to the second information selection unit 42B. The second information selection unit 42B has a register in which stores the modification information (+0.001), and inputs +0 to the table selection unit 46 for modification information if the second relative address is lower than the change point relative address according to the comparison result which was input, and inputs the modification information (+0.001) if the second relative address is higher than the change point relative address.

The table selection address is first input to a table selection unit 45 for representative information. In the table selection unit 45 for representative information, the representative information contained in the results of referring to the first and second correspondence information storage units 5 are input respectively, and if the table selection address which was input is 0, the representative information of the first correspondence information storage unit 5A is input to the addition unit 44, if the table selection address which was input is not 0, the representative information of the second correspondence information storage unit 5B is input to the addition unit 44.

The table selection address is then input to the table selection unit 46 for modification information. And just like the above case, the modification information of the first correspondence information storage unit 5A is input to the addition unit 44 if the table selection address which was input is 0, otherwise the modification information of the second correspondence information storage unit 5B is input thereto. The addition unit 44 adds the representative information and modification information which were input, and outputs the addition result as the output data.

For example, it is assumed that the input data 00101 was provided. In the first correspondence information storage unit

5A, the representative address is 01 and the relative address is 01. First the correspondence information storage unit 5 is referred to by the representative address (01), and the representative information (+0.010) is acquired as the table reference result, and 11 is acquired as the change point relative address. Then in the first relative address comparison unit 41A, the relative address (01) and the change point relative address (11) are compared, and as a result of comparison (01<11), the first information selection unit 42A selects +0, and inputs it to the table selection unit 46 for modification information. On the other hand, in the second correspondence information storage unit 5B, the representative address is 0 and the relative address is 101. First the correspondence information storage unit 5B is referred to by the representative address (0), and the representative information (+0.110) is acquired as the table reference result, and 100 is acquired as the change point relative address. Then in the second relative address comparison unit 41B, the relative address (101) and the change point relative address (100) are compared, and as a result of comparison (101>100), the second information selection unit 42B selects +0.001, and inputs it to the table selection unit 46 for modification information. Since the table selection address is 0, the representative information (+0.010) of the first correspondence information storage unit 5A is selected in the table selection unit 45 for representative information, and the modification information (+0) of the first correspondence information storage unit 5A is selected in the table selection unit 46 for modification information, and the result (+0.010) added by the addition unit 44 is output.

Conventionally 5-bit output data is corresponded to each 5-bit address (32 addresses), so 32*5=160 bits of memory capacity is required, but according to the fourth embodiment, the first correspondence information storage unit 5 for corresponding 5-bits of representative information and 2-bits of relative address to each 2-bit representative address (4 addresses), requires 4*(5+2)=28 bits, and the second correspondence information storage unit 5 for corresponding 5-bits of representative information and 3-bits of relative address to each 1-bit representative address (2 addresses) require 2*(5+3)=16 bits, so a total of 44 bits of memory capacity is sufficient for the two correspondence information storage units 5. Thus using the lookup table where the required memory capacity is decreased compared with prior art, output data the same as FIG. 5 can be acquired.

Now the lookup table, having the information storage unit where a plurality of change point relative addresses are stored, will be described as a variant form of the fourth embodiment. According to the fourth embodiment, an address is divided at every four addresses in the first half, and at every eight addresses in the latter half, and two correspondence information storage units 5 are provided, but according to the present variant form, an address is divided in every eight addresses in both the first half and the latter half.

Figure 13:
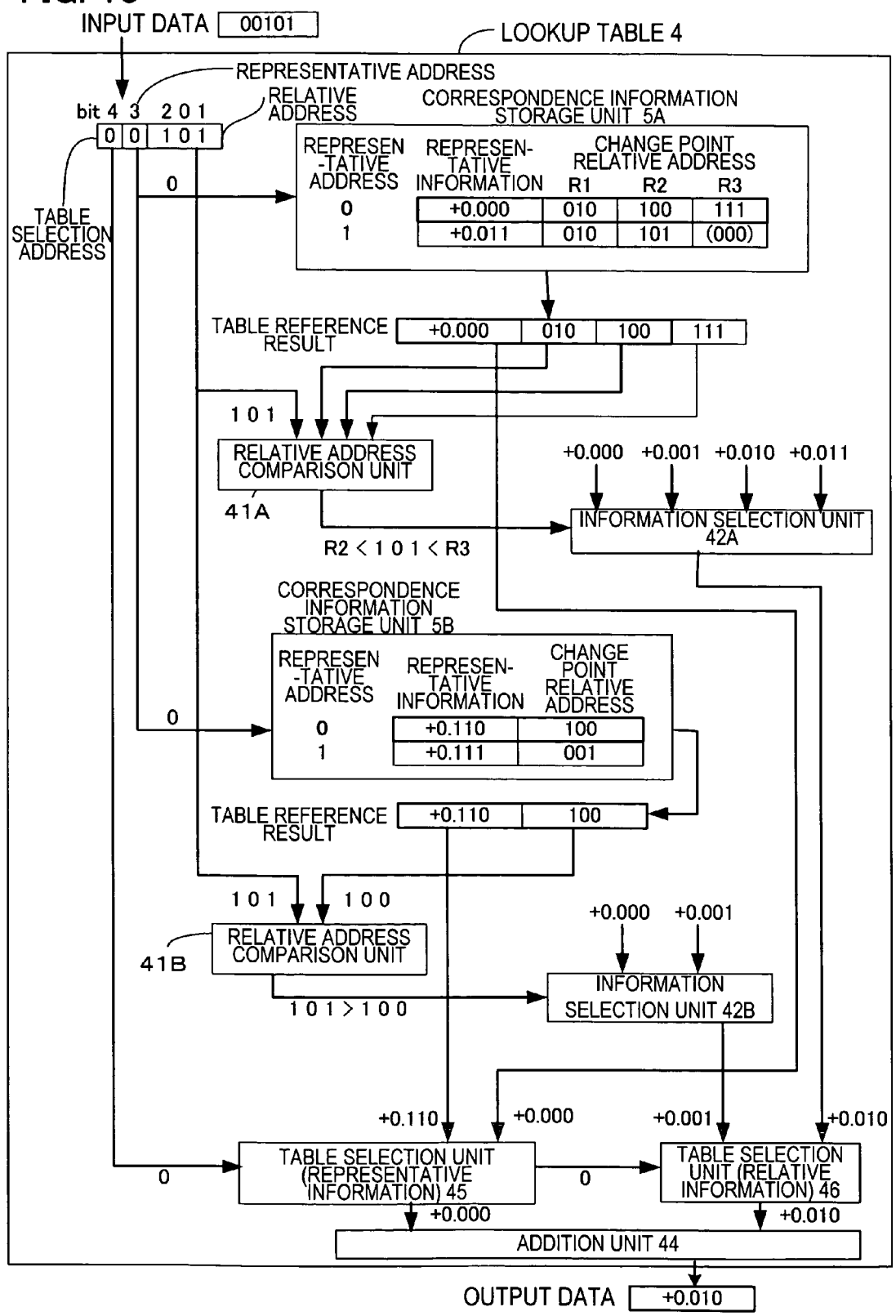
FIG. 13 is a diagram depicting a variant form of the fourth embodiment of the present invention.

FIG. 13 is a block diagram of the lookup table depicting the variant form of the fourth embodiment of the present invention. According to the variant form of the fourth embodiment, an address is divided at every eight addresses for both the first half and the latter half, and in the latter half, where the number of change points decrease, the memory capacity required for the lookup table can be decreased. For this two correspondence information storage units 5 are provided, where 5-bits of an address is divided into 1-bit for the table selection, 1-bit for the representative address and 3-bits for the relative address.

And the first correspondence information storage unit 5A is referred to by the representative address. In the first correspondence information storage unit 5A in FIG. 13, the representative information corresponding to the two addresses (representative address 00 to 01) in the first half of the variant form of the third embodiment (FIG. 11) and the change point relative address are stored.

The relative address and the change point relative address contained in the reference result of the correspondence information storage unit 5A are input to the first relative address comparison unit 41A, and the relative address comparison unit 41A judges the section containing the relative address, and inputs the result to the information selection unit 42A. More specifically, the relative address and each change point relative address are compared as binary values, and the number of times when the relative address is judged as higher than the change point relative address is input to the information selection unit 42A. The information selection unit 42A has a register, selects +0 if the number of times of input is 0, +0.001 if once, +0.010 if twice and +0.011 if three times, and inputs it to the table selection unit 46 for modification information.

On the other hand, the second correspondence information storage unit 5B is also referred to by the representative address. In the second correspondence information storage unit 5B, the representative information corresponding to the two addresses (representative addresses 10 to 11) in the latter half of the variant form of the third embodiment (FIG. 11) and the change point relative address are stored. Since there is one change point, R2 and R3 are unnecessary for the correspondence information storage unit 5B in FIG. 13.

The relative address and the change point relative address contained in the reference result of the correspondence information storage unit 5B are input to the second relative address comparison unit 41B, and it is judged whether the relative address is higher than the change point relative address. So the relative address comparison unit 41B compares the relative address of the input data and the change point relative address as binary values, and inputs the result to the second information selection unit 42B. The second information selection unit 42B has a register in which stores the modification information (+0.001), and inputs +0 if the second relative address is lower than the change point relative address according to the comparison result which was input, and inputs the modification information (+0.001) to the table selection unit 46 for modification information if the second relative address is equal to or higher than the change point relative address.

The table selection address is first input to the table selection unit 45 for representative information. In the table selection unit 45 for representative information, the representative information contained in the results of referring to the first and second correspondence information storage units 5A, 5B are input respectively, where the representative information of the first correspondence information storage unit 5A is input to the addition unit 44 if the table selection address which was input is 0, otherwise the representative information of the second correspondence information storage unit 5B is input thereto.

The table selection address is then input to the table selection unit 46 for modification information. And just like the above case, the modification information of the first correspondence information storage unit 5A is input to the addition unit 44 if the table selection address which was input is 0, otherwise the modification information of the second correspondence information storage unit 5B is input thereto. The addition unit 44 adds the representative information and modification information which were input, and outputs the addition result as the output data.

For example, it is assumed that the input data 00101 was provided. In the first correspondence information storage unit 5A, the representative address is 0 and the relative address is 101. First the correspondence information storage unit 5A is referred to by the representative address (0), and the representative information (+0.000) is acquired as the table reference result, and R1 (010), R2 (100) and R3 (111) are acquired as the change point relative addresses. Then in the first relative address comparison unit 41A, the relative address (101) and the three change point relative addresses are compared, and as a result of comparison (R2<101<R3), it is known that the relative address of the input data becomes higher than the change point relative address twice. So the first information selection unit 42A selects +0.010, and inputs it to the table selection unit 46 for modification information.

On the other hand, in the second correspondence information storage unit 5B, the correspondence information storage unit 5B is referred to by the representative address (0), and the representative information (+0.110) is acquired as the table reference result, and 100 is acquired as the change point relative address. Then in the second relative address comparison unit 41B, the relative address (101) and the change point relative address (100) are compared, and as a result of comparison (101>100), the second information selection unit 42B selects +0.001, and inputs it to the table selection unit 46 for modification information. Since the table selection address is 0, the representative information (+0.010) of the first correspondence information storage unit 5A is selected in the table selection unit 45 for representative information, and the modification information (+0) of the first correspondence information storage unit 5A is selected in the table selection unit 46 for modification information, and the result (+0.010) added by the addition unit 44 is output.

Conventionally 5-bit output data is corresponded to each 5-bit address (32 addresses), so 32*5=160 bits of memory capacity is required, but according to the variant form of the fourth embodiment, the first correspondence information storage unit 5 for corresponding a set of 5-bits of representative information and three 3-bits of relative addresses to each 1-bit representative address (2 addresses) requires 2*(5+3*3)=28 bits, and the second correspondence information storage unit 5 for corresponding 5-bits of representative information and 3-bits of relative address to each 1 bit representative address (2 addresses) requires 2*(5+3)=16 bits, so a total of 44 bits of memory capacity is sufficient for the two correspondence information storage units 5. Thus using the lookup table where the required memory capacity is decreased compared with prior art, output data the same as FIG. 5 can be acquired.

Figure 14:
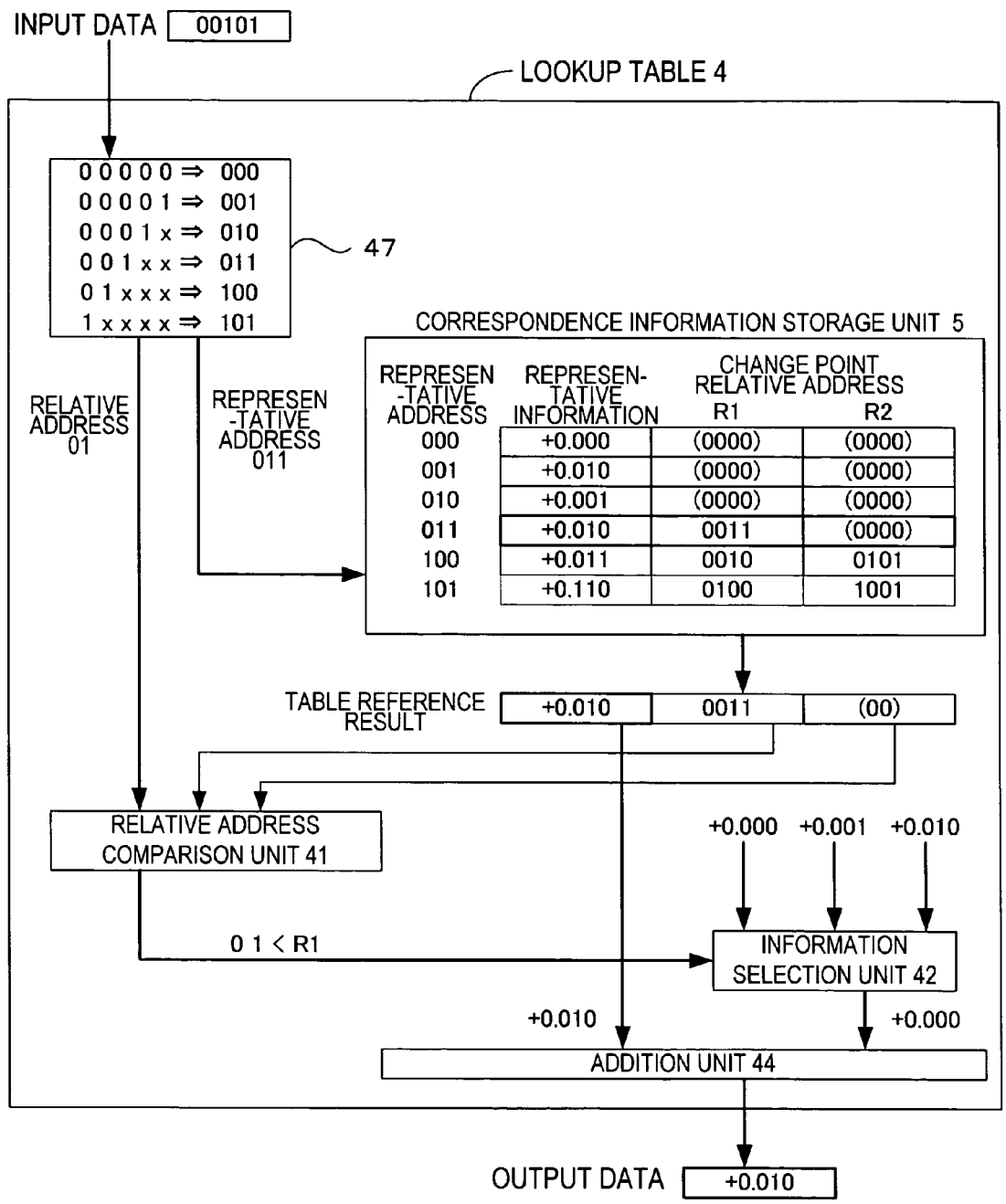
FIG. 14 is a diagram depicting the fifth embodiment of the present invention.

FIG. 14 is a block diagram of the lookup table depicting the fifth embodiment of the present invention. According to the fifth embodiment, the output data is classified by the significant bit storing 1 in the address, and this corresponds to the 6 divisions in FIG. 5.

The input data which was input to the lookup table 4 in FIG. 14 is input to a address generation section 47. The address generation section 47 classifies the address into six types: 00000 (1 is not included), 00001 (fifth bit is 1), 0001x (fourth bit is 1), 001xx (third bit is 1), 01xxx (second bit is 1) and 1xxxx (first bit is 1), corresponds each of these to the representative addresses 000 to 101, and generates the bits lower than the most significant bit storing 1 (the portion of x) as the relative address. And the correspondence information storage unit 5 is referred to by the generated representative address.

In the correspondence information storage unit 5 in FIG. 14, the representative information and a plurality of change point relative addresses are stored respectively for each block corresponding to the representative address. Just like the variant form of the third embodiment (FIG. 11), the degree of change is +0.001 at all the change points, so the relative information and modification information are omitted. For the change point relative addresses, 4 bits are secured matching the longest bits of the relative address.

For example, in the block corresponding to the representative address 011, the output data is +0.010 in the relative addresses 00, 01 and 10, and the output data is +0.011 in the relative address 11. This corresponds to the fourth block of the 6 divisions in FIG. 5.

When the correspondence information storage unit 5 is referred to by the representative address generated by the address generation section 47, the information stored in the corresponding representative address is acquired as the reference result. The relative address of the input data and the change point relative address contained in the reference result of the correspondence information storage unit 5 are input to the relative address comparison unit 41, and the position of the relative address with respect to the change points R1 and R2 is judged. The relative address comparison unit 41 compares the relative address and each change point relative address as binary values, and inputs the number of times when the relative address was judged as equal to or higher than the change point relative address to the information selection unit 42. If the change point relative address included in the table reference result is 0000, the relative address comparison unit 41 inputs 0 times to the information selection unit 42. The information selection unit 42 has a register and selects +0 if the number of times of input is 0, selects 0.001 if once, +0.010 if twice and +0.11 if three times, and inputs the value to the addition unit 44. The addition unit 44 adds the representative information and the selection result contained in the reference result of the correspondence information storage unit 5, and outputs the addition result as the output data.

For example, it is assumed that the input data 00101 was provided. The most significant bit storing 1 in the address is the third bit, and this corresponds to 001xx. So the address generation section 47 generates 011 as the representative address, and 01 for the above xx as the relative address. First the correspondence information storage unit 5 is referred to by the representative address (011), and the representative information (+0.010) and the change point relative address (0011) are acquired as the table reference result. Then the relative address (01) and the change point relative address (0011) are compared in the relative address comparison unit 41, and as the result of comparison (01<0011), the number of times when the relative address of the input data becomes higher than the change point relative address is 0. So the information selection unit 42 selects (+0.000), which is added to the representative information (+0.010) in the addition unit 44, and the result (+0.010) is output.

Conventionally 5-bit output data is corresponded to each 5-bit address (32 addresses), so 32*5=160 bits of memory capacity is required, but according to the fifth embodiment, a set of 5-bits of representative information and two 4-bits of relative addresses are corresponded to each of six representative addresses, so 6*(5+4*2)=78 bits of memory capacity is sufficient. Thus using the lookup table where required memory capacity is decreased compared with prior art, output data the same as FIG. 5 can be acquired.

According to the embodiments of the present invention described above, the input data is divided into a plurality of blocks, the blocks are corresponded to each address of the correspondence information storage unit 5, and if each block is divided into a plurality of sections according to the change of the output data, the position information to indicate the boundary of the section and the output data in each section are stored in an address corresponding to each block, so the memory capacity required for the lookup table can be decreased.

It is preferable that the block is divided so that there are a maximum of two sections in the block. If the block is determined according to the state of change of the output data, such as if the corresponding output data greatly changes when the input data is changed, the input data contained in the block is decreased, and if the corresponding output data hardly changes even when the input data is changed, the output data contained in the block is increased, then the memory capacity can be further decreased. If the difference between the output data is constant, the memory capacity can be further decreased. Also when some of the output data in each section is the representative information and the remainder is the relative information, and if the difference between the relative information and the representative information is less than the number of bits required for the relative information, the memory capacity can be further decreased.

When the input data is provided to the lookup table containing the above mentioned correspondence information storage unit 5, if the block and the section to which the input data belongs are specified, the output data in that section can be acquired as the output data corresponding to the input data. This output data is the same output data as that acquired when the conventional lookup table is used. Therefore the memory capacity can be decreased without dropping the accuracy of prior art.

INDUSTRIAL APPLICABILITY

The lookup table of the present invention can be enclosed in an LSI (Large Scale Integration) since the required memory capacity can be decreased. Enclosing the lookup table in an LSI allows using memories with different configurations, so the total memory capacity can be further decreased. The present invention can be effectively applied when the output data changes periodically, when a same value is output for a plurality of input data, or when the degree of change of the output data is different depending on the section. For example, application of the present invention is effective when a function value corresponding to the input data is determined, and more particularly for a sine function, cosine function and other periodic function. Specifically, the present invention can be applied to Fourier transform and fast Fourier transform in the signal processing field.

The scope of the protection of the present invention shall not be limited to the above embodiments, but cover the invention disclosed in the Claims and the equivalents thereof.

The invention claimed is:

1. A lookup table for outputting second data corresponding to first data which has been input, comprising:
 a correspondence information storage unit, a plurality of said first data and a plurality of said second data which correspond to said plurality of first data respectively are prepared in advance, a first predetermined number of bits are set as a representative address in each of said first data, a second predetermined number of bits not used for said representative address are set as a relative address in each of said first data, said plurality of first data is classified into a plurality of blocks by said representative address, said representative address is corresponded to each of said plurality of blocks, a range, where said second data corresponding to said first data contained in each of said plurality of blocks take a same value continuously, is regarded as one section, and each of said plurality of blocks is divided into at least one section, where a combination of said second data for each of said section in a block corresponding to said representative address out of said plurality of blocks and said relative address for specifying a position of the boundary of said section is stored in an address specified by said representative address respectively, an address specified by said representative address of said first data which has been input is referred to, and said combination which corresponds thereto is output;
 a relative address comparison unit connected to said correspondence information storage unit for comparing said relative address of said first data which has been input with said relative address contained in said combination, and specifying the section containing said first data which has been input; and
 an information selection unit connected to said correspondence information storage unit and said relative address comparison unit, for outputting said second data corresponding to the section containing said first data which has been input out of said second data for each of said section contained in said combination.

2. The lookup table according to claim 1, wherein
 said correspondence information storage unit stores a combination of representative information selected from said second data for each of said sections in a block corresponding to said representative address out of said plurality of blocks, modification information which is a difference between said second data for each of said sections and said representative information, and said relative address for specifying said position of the boundary of said section, instead of storing the combination of said second data for each of said sections in said block corresponding to said representative address out of said plurality of blocks and said relative address for specifying said position of the boundary of said section, and
 said information selection unit selects said modification information corresponding to said section containing said first data which has been input, out of said modification information contained in said combination, and outputs data after said representative information is added to said selected modification information as a second data, instead of outputting said second data corresponding to the section containing said first data which has been input out of said second data for each of said section contained in said combination.

3. The lookup table according to claim 1, further comprising:
 a storage unit connected to said information selection unit, wherein
 said correspondence information storage unit stores a combination of representative information selected from said second data for each of said section in a block corresponding to said representative address out of said plurality of blocks, and said relative address for specifying said position of the boundary of said section, instead of storing the combination of said second data for each of said section in a block corresponding to said representative address out of said plurality of blocks and said relative address for specifying said position of the boundary of said section,
 said storage unit stores a value to be added to said representative information according to the section containing said first data as said modification information, and said information selection unit selects said modification information stored in said storage unit according to said section containing said first data which has been input, and outputs data after said representative information is added to said selected modification information as a second data, instead of outputting said second data corresponding to said section containing said first data which has been input, out of said second data for each of said sections contained in said combination.

4. A lookup table for outputting second data corresponding to first data which has been input, comprising:
a correspondence information storage unit, a plurality of said first data and a plurality of said second data which correspond to said plurality of first data respectively are prepared in advance, a representative address is corresponded according to the most significant bit position out of bits storing 1 in each of said first data, a predetermined number of bits out of bits lower than said most significant bit position are set as a relative address in each of said first data, said first data is classified into a plurality of blocks by said representative address, said representative address is corresponded to each of said plurality of blocks, a range, where said second data corresponding to said first data contained in each of said plurality of blocks takes a same value continuously, is regarded as one section, and each of said plurality of blocks is divided into at least one section, where a combination of said second data for each of said section in a block corresponding to said representative address out of said plurality of blocks and said relative address for specifying a position of the boundary of said section is stored in an address specified by said representative address respectively, an address specified by said representative address of said first data which has been input is referred to, and said combination which corresponds thereto is output;
a relative address comparison unit connected to said correspondence information storage unit for comparing said relative address of said first data which has been input and said relative address contained in said combination, and specifying the section containing said first data which has been input; and
an information selection unit connected to said correspondence information storage unit and said relative address comparison unit, for outputting said second data corresponding to the section containing said first data which has been input out of said second data for each section contained in said combination.

5. The lookup table according to claim 1, wherein
two or more said correspondence information storage units exists, a third predetermined number of bits out of the bits not used for said representative address and said relative address in said first data which has been input are set as a table selection address, and the correspondence information storage unit selected from said plurality of correspondence information storage units is used based on said table selection address.

6. A data acquisition method, in a lookup table of a storage unit, outputting second data corresponding to first data which has been input, for acquiring said second data corresponding to said first data which has been input on the basis of the lookup table, comprising the steps of:
preparing a plurality of said first data and a plurality of said second data which correspond to said plurality of first data respectively in advance, a first predetermined number of bits are set as a representative address in each of said first data, a second predetermined number of bits not used for said representative address are set as a relative address in each of said first data, said plurality of first data are classified into a plurality of blocks by said representative address, said representative address is corresponded to each of said plurality of blocks, a range, where said second data corresponding to said first data contained in each of said plurality of blocks takes a same value continuously, is regarded as one section, each of said plurality of blocks is divided into at least one said section, and said second data for each of said sections is corresponded to each of said plurality of blocks;
specifying said block containing said first data which has been input out of said plurality of blocks using said representative address of said first data which has been input;
specifying said section containing said first data which has been input out of said sections contained in said specified block using said relative address of said first data which has been input; and
acquiring said second data corresponded to said specified section from the lookup table of the storage unit.

7. A data acquisition method, in a lookup table of a storage unit, outputting second data corresponding to first data which has been input, for acquiring said second data corresponding to said first data which has been input on the basis of the lookup table, comprising the steps of:
preparing a plurality of first data and a plurality of second data which correspond to said plurality of first data respectively in advance, a representative address is corresponded according to the most significant bit position out of bits storing 1 in each of said first data, a predetermined number of bits out of bits lower than said most significant bit position are set as a relative address in each of said first data, said first data is classified into a plurality of blocks by said representative address; said representative address is corresponded to each of said plurality of blocks, a range, where said second data corresponding to said first data contained in each of said plurality of blocks take a same value continuously, is regarded as one section, and each of said plurality of blocks is divided into at least one section, and said second data for each of said sections is corresponded to each of said plurality of blocks;
specifying a block containing said first data which has been input out of said plurality of blocks using said representative address of said first data which has been input;
specifying a section containing said first data which has been input out of said sections contained in said specified block using said relative address of said first data which has been input; and
acquiring said second data corresponded to said specified section from the lookup table of the storage unit.

8. The data acquisition method according to claim 6, wherein
corresponding a representative information selected from said second data for each of said section and a modification information which is a difference between said second data for each of said sections and said representative information, to said plurality of blocks respectively, instead of corresponding said second data for each of said sections to said plurality of blocks respectively, and
selecting said modification information corresponding to said specified section, and acquiring a data after said representative information is added to said selected modification information, as said second data, instead of acquiring said second data corresponded to said specified section.

9. An information processing apparatus comprising:
a processing unit;

a storage unit storing a combination of second data corresponding to a first address, and a second address determining a boundary of a section in which said second data, corresponding to first data, taking a same value is stored, a first portion of first data is set as said first address, and a second portion of said first data is set as said second address;

a comparison unit comparing a second address of input first data and a second address included within a combination retrieved from said table unit by using a first address corresponding to said input first data, to determine a section in which said input first data is included; and a selection unit selecting second data corresponding to said section determined by said comparison unit.

10. A look-up table stores second data corresponding to first data, comprising:

a storage unit for storing a combination of second data corresponding to a first address, and a second address specifying a boundary of a section in which said second data corresponding to fist data and taking a same value is stored, a first portion of said first data having a predetermined number of bits is set as said first address, and a second portion of said first data having a second predetermined number of bits is set as said second address;

a comparison unit comparing a second address of input first data and a second address included within said combination read from said storage unit by using a first address corresponding to said input first data, to determine a section in which said input first data is included; and a selection unit selecting second data corresponding to said section determined by said comparison unit.

11. A data acquisition method, in a lookup table of a storage unit, outputting second data corresponding to input first data, for acquiring said second data corresponding to said input first data on the basis of the lookup table, comprising the steps of:

determining a block in which input first data is included, from a plurality of blocks, by using a first portion of said input first data, each of said blocks stores first data classified by said first sets of bits;

determining a section of determined block in which said input first data is included from a plurality of sections, each of said sections stores second data taking a same value corresponding to first data, by using a second portion of said input first data; and outputting a second data corresponding to said determined section from the lookup table of the storage unit.

* * * * *